(12) United States Patent
Jang et al.

(10) Patent No.: US 11,956,080 B2
(45) Date of Patent: Apr. 9, 2024

(54) PUNCTURING-BASED 240 MHZ TRANSMISSION

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Eunsung Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/211,449

(22) Filed: Jun. 19, 2023

(65) Prior Publication Data

US 2023/0336272 A1 Oct. 19, 2023

Related U.S. Application Data

(63) Continuation of application No. 17/775,238, filed as application No. PCT/KR2020/015628 on Nov. 9, 2020.

(30) Foreign Application Priority Data

| Nov. 7, 2019 | (KR) | 10-2019-0142124 |
| Dec. 5, 2019 | (KR) | 10-2019-0161031 |
| Jun. 16, 2020 | (KR) | 10-2020-0073144 |
| Jun. 19, 2020 | (KR) | 10-2020-0075163 |

(51) Int. Cl.
*H04L 1/00* (2006.01)

(52) U.S. Cl.
CPC .................. *H04L 1/0069* (2013.01)

(58) Field of Classification Search
CPC ........................................ H04L 1/0069
See application file for complete search history.

(56) References Cited

U.S. PATENT DOCUMENTS

| 2019/0116545 A1* | 4/2019 | Verma ............... H04W 8/24 |
| 2019/0327740 A1* | 10/2019 | Verma ............... H04L 5/008 |
| 2021/0321388 A1* | 10/2021 | Kwon ............... H04L 5/0037 |
| 2022/0393843 A1* | 12/2022 | Verma ............... H04W 72/00 |
| 2023/0007571 A1* | 1/2023 | Huang ............... H04W 48/08 |

* cited by examiner

*Primary Examiner* — Thien Nguyen
(74) *Attorney, Agent, or Firm* — LEE, HONG, DEGERMAN, KANG & WAIMEY

(57) ABSTRACT

In a wireless local area network (WLAN) system, a transmission STA can transmit a PPDU via a 320 MHz channel, and a Medium Access Control (MAC) signal may be generated for the PPDU. The MAC signal may include puncturing pattern information and channel center frequency segment (CCFS) information for a 320 MHz band. The CCFS information may include a first CCFS field related to channel center frequency (CCF) information of a primary 160 MHz channel, and a second CCFS field related to CCF information of a 320 MHz channel.

18 Claims, 30 Drawing Sheets

FIG. 1
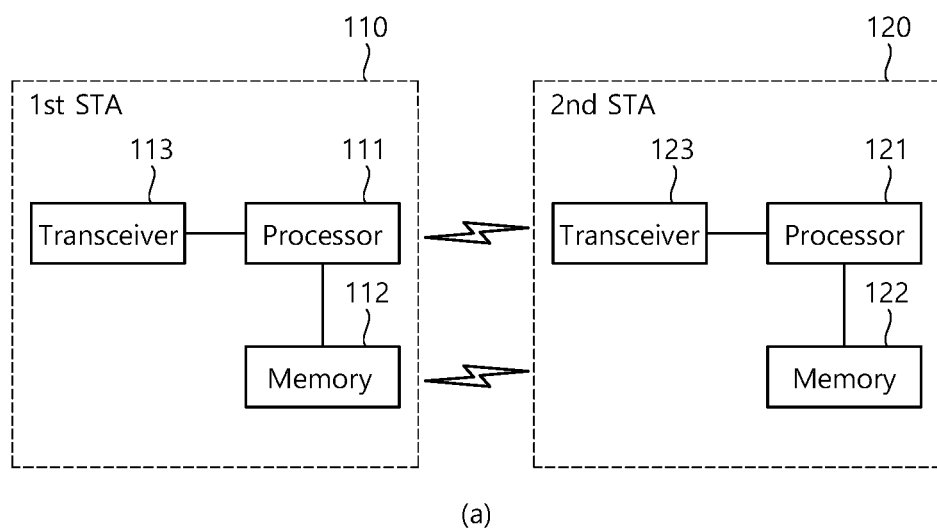
(a)
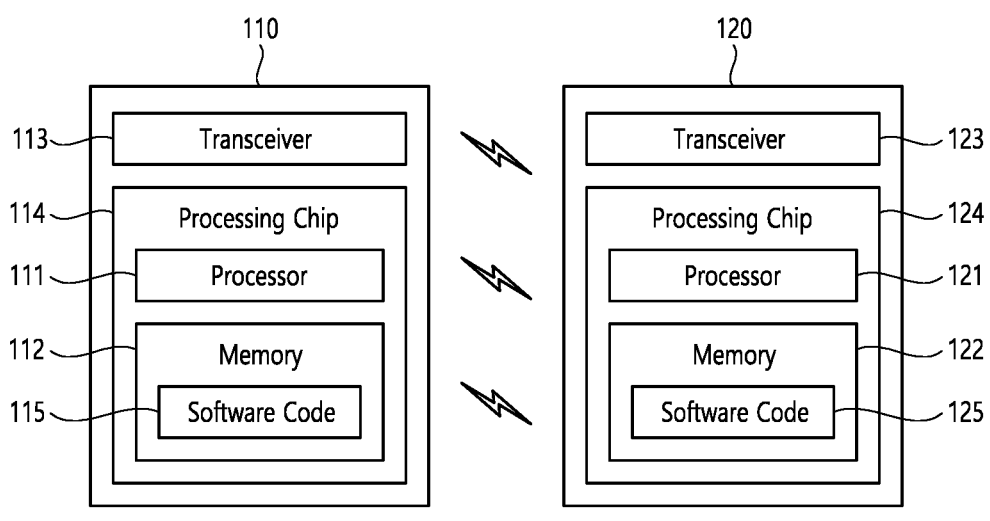
(b)

FIG. 2
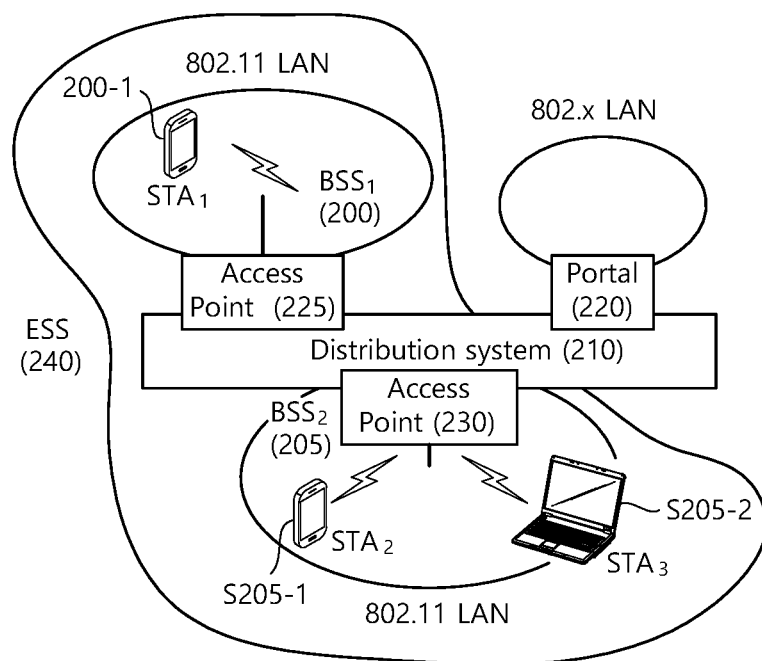
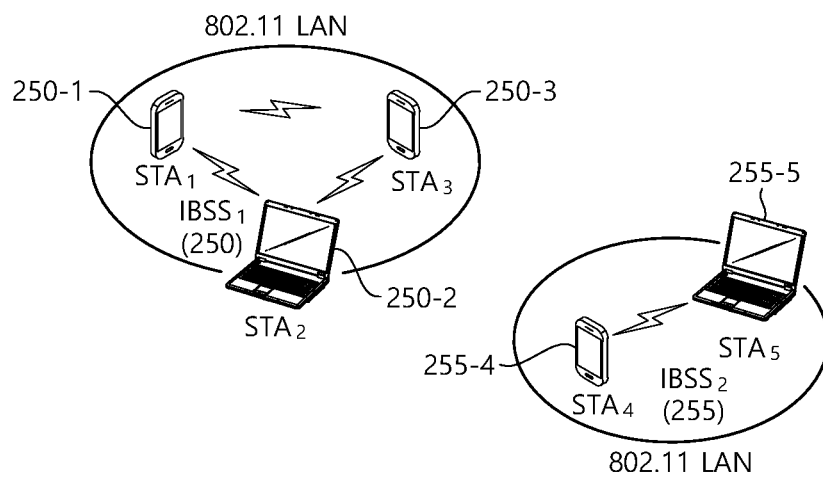

FIG. 18

| L-LTF | L-STF | L-SIG | RL-SIG | SIG A | SIG B | STF | LTF | Data | PE |

| CCFS | BSS bandwidth |
|---|---|
| CCFS 1 > 0, CCFS 2>0.<br>\|CCFS 1 - CCFS 0\| = 8 (40MHz apart), and<br>\|CCFS 2 - CCFS 1\| = 8 (40MHz apart) | 240MHz<br>CCFS 0: CCF for P80<br>CCFS 1: CCF for P160<br>CCFS 2: CCF for P240 |
| CCFS 1 > 0, CCFS 2>0.<br>Satisfying one of the following two cases (case-1 and case-2)<br>1) \|CCFS 1 - CCFS 0\| > 16 (>80MHz apart) and CCFS2 - CCFS 1 = 8 (40MHz apart)<br>2) \|CCFS 1 - CCFS 0\| = 8 (40MHz apart) and \|CCFS 2 - CCFS 1\| > 16 (>80MHz apart) | 80MHz + 160MHz /160MHz + 80MHz<br>CCFS 0: CCF for P80<br>CCFS 1: CCF for S80 - 1<br>CCFS 2: CCF for S80 - 2 |
| CCFS 1 > 0, CCFS 2>0.<br>\|CCFS 1 - CCFS 0\| = 8 (40MHz apart), and<br>\|CCFS 2 - CCFS 1\| = 16 (80MHz apart) | 320MHz<br>CCFS 0: CCF for P80<br>CCFS 1: CCF for P160<br>CCFS 2: CCF for P320 |
| CCFS 1 > 0, CCFS 2>0.<br>\|CCFS 1 - CCFS 0\| = 8 (40MHz apart), and \|CCFS 2 - CCFS 1\| > 32 (>160MHz apart) | 160MHz + 160MHz<br>CCFS 0: CCF for P80<br>CCFS 1: CCF for P160<br>CCFS 2: CCF for S160 |

FIG. 22

Puncturing patterns
- 240/160+80 MHz

- [oooo oooo oooo oooo], [xxxx oooo oooo oooo], [oooo xxxx oooo oooo], [oooo oooo xxxx], [xxoo oooo oooo oooo], [ooxx oooo oooo oooo], [oooo xxoo oooo oooo], [oooo ooxx oooo oooo], [oooo oooo xxoo], [oooo oooo ooxx]

o: non-punctured 20MHz channel
x: punctured 20MHz channel

FIG. 24

Puncturing patterns in 320/160+160 MHz PPDU o: non-punctured 20MHz channel
x: punctured 20MHz channel

- 1 case for 4x996
  • [oooo oooo oooo oooo]

- 4 cases for 3x996
  • [xxxx oooo oooo oooo oooo], [oooo xxxx oooo oooo oooo], [oooo oooo xxxx oooo oooo], [oooo oooo oooo xxxx oooo], [oooo oooo oooo oooo xxxx]

- 8 cases for 3x996+484
  • [xxoo oooo oooo oooo oooo], [ooxx oooo oooo oooo oooo], [oooo xxoo oooo oooo oooo], [oooo ooxx oooo oooo oooo], [oooo oooo xxoo oooo oooo], [oooo oooo ooxx oooo oooo], [oooo oooo oooo xxoo oooo], [oooo oooo oooo ooxx oooo]

- 6 cases for 2x996
  • [xxxx xxxx oooo oooo oooo], [xxxx oooo xxxx oooo oooo], [xxxx oooo oooo xxxx oooo], [xxxx oooo oooo oooo xxxx], [oooo xxxx xxxx oooo oooo], [oooo xxxx oooo xxxx oooo], [oooo xxxx oooo oooo xxxx], [oooo oooo xxxx xxxx oooo], [oooo oooo xxxx oooo xxxx], [oooo oooo oooo xxxx xxxx]

- 24 cases for 2x996+484
  • [xxxx xxoo oooo oooo oooo], [xxxx ooxx oooo oooo oooo], [xxxx oooo xxoo oooo oooo], [xxxx oooo ooxx oooo oooo], [xxxx oooo oooo xxoo oooo], [xxxx oooo oooo ooxx oooo], [xxoo xxxx oooo oooo oooo], [ooxx xxxx oooo oooo oooo], [oooo xxxx xxoo oooo oooo], [oooo xxxx ooxx oooo oooo], [oooo xxxx oooo xxoo oooo], [oooo xxxx oooo ooxx oooo], [xxoo oooo xxxx oooo oooo], [ooxx oooo xxxx oooo oooo], [oooo xxoo xxxx oooo oooo], [oooo ooxx xxxx oooo oooo], [oooo oooo xxxx xxoo oooo], [oooo oooo xxxx ooxx oooo], [xxoo oooo oooo xxxx oooo], [ooxx oooo oooo xxxx oooo], [oooo xxoo oooo xxxx oooo], [oooo ooxx oooo xxxx oooo], [oooo oooo xxoo xxxx oooo], [oooo oooo ooxx xxxx oooo]

PUNCTURING-BASED 240 MHZ TRANSMISSION

CROSS-REFERENCE TO RELATED APPLICATIONS

This application is a continuation of U.S. patent application Ser. No. 17/775,238, filed on May 6, 2022, which is the National Stage filing under 35 U.S.C. 371 of International Application No. PCT/KR2020/015628, filed on Nov. 9, 2020, which claims the benefit of earlier filing date and right of priority to Korean Application Nos. 10-2019-0142124, filed on Nov. 7, 2019, 10-2019-0161031, filed on Dec. 5, 2019, 10-2020-0073144, filed on Jun. 16, 2020, and 10-2020-0075163, filed on Jun. 19, 2020, the contents of which are all incorporated by reference herein in their entirety.

BACKGROUND

Field of the Disclosure

The present specification relates to a method of signaling, via a MAC layer information, related to puncturing in a part of a 320 MHz band in a wireless local area network (WLAN) system.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Solutions

A method performed by a transmitting STA (station) in a wireless local area network (WLAN) system according to various embodiments may include technical features related to a basic service set (BSS) setting method through puncturing. The transmitting STA may generate a physical protocol data unit (PPDU) including channel center frequency segment (CCFS) information and first puncturing pattern information. The transmitting STA may transmit the PPDU through a 320 MHz channel. The CCFS information includes CCFS0 which is channel center frequency (CCF) information of a primary 80 MHz channel, CCFS1 which is CCF information of a primary 160 MHz channel, and CCFS2 which is CCF information of a 320 MHz channel. The CCFS0 and the CCFS1 may have a value greater than zero (0), a difference between the CCFS1 and the CCFS0 may have a value of eight (8), and a difference between the CCFS2 and the CCFS1 may have a value of sixteen (16).

The first puncturing pattern information may include information related to whether puncturing is performed for an 80 MHz band unit included in the 320 MHz channel.

Technical Effects

According to an example of the present specification, CCFS information for the 320 MHz band may be transmitted to support the 320 MHz band, and resources may be efficiently used through the puncturing.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 18 illustrates an example of a PPDU used in the present specification.

FIG. 21 is a diagram illustrating an embodiment in which CCFS is defined.

FIG. 22 is a diagram illustrating an embodiment of a puncturing pattern.

FIG. 24 is a diagram illustrating an example of a 320/160+160 MHz puncturing pattern.

DETAILED DESCRIPTION

Figure 3:
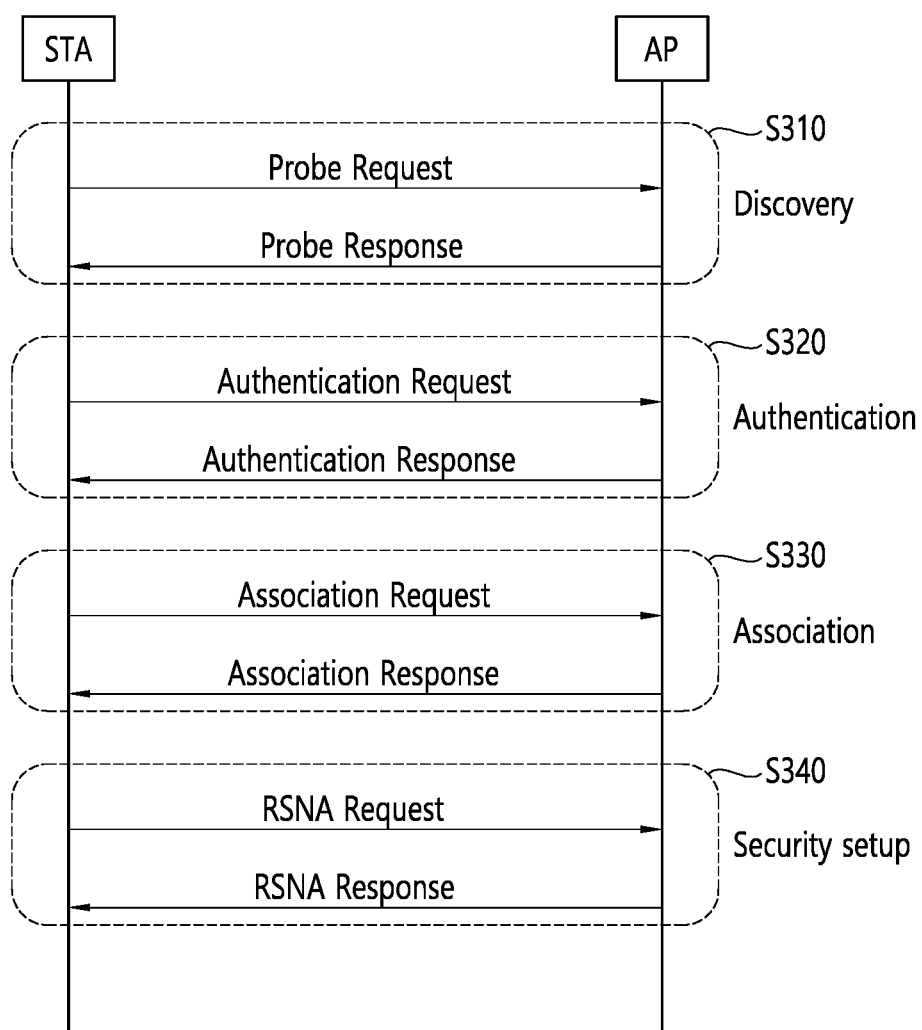
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
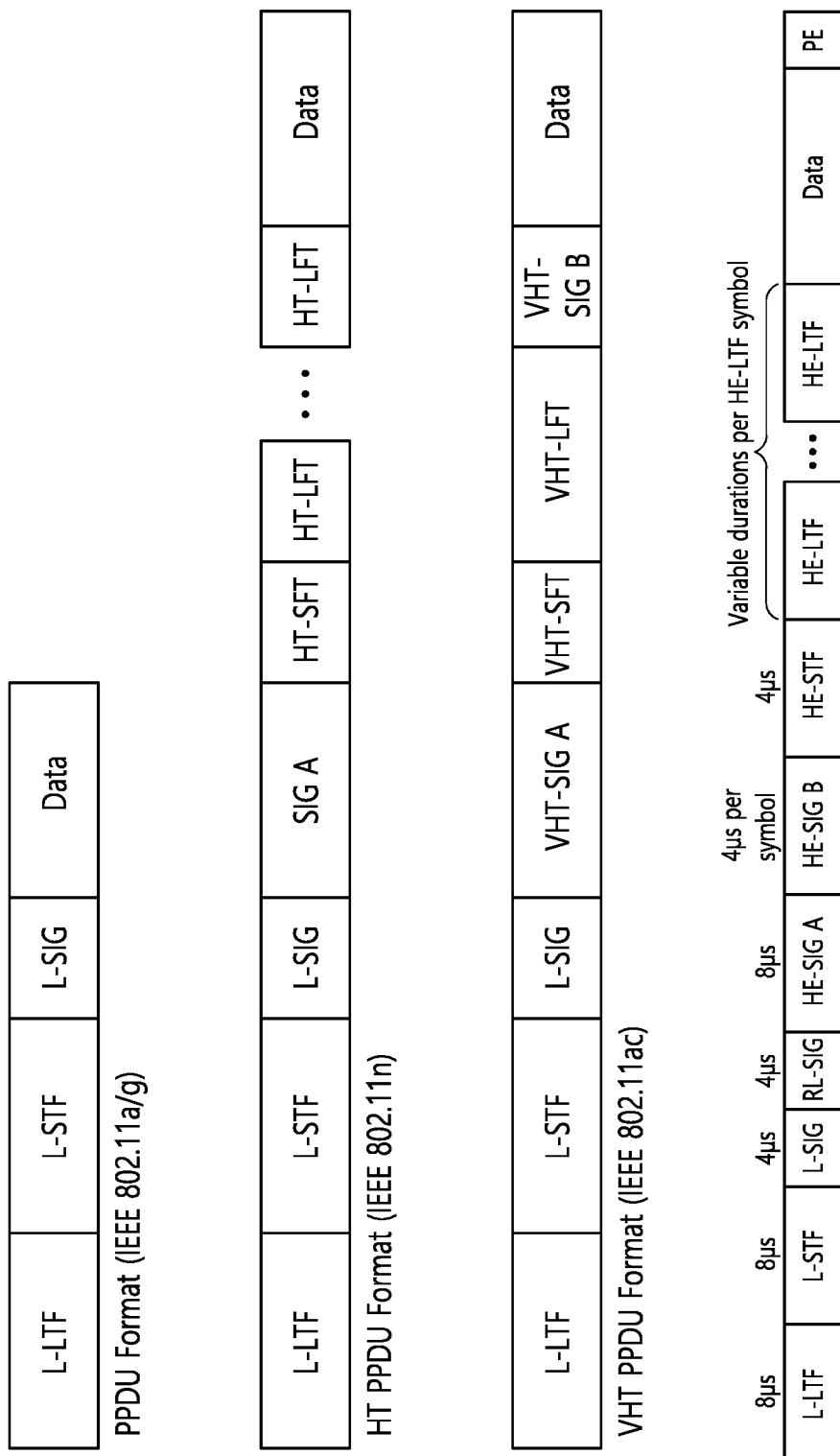
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and an STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
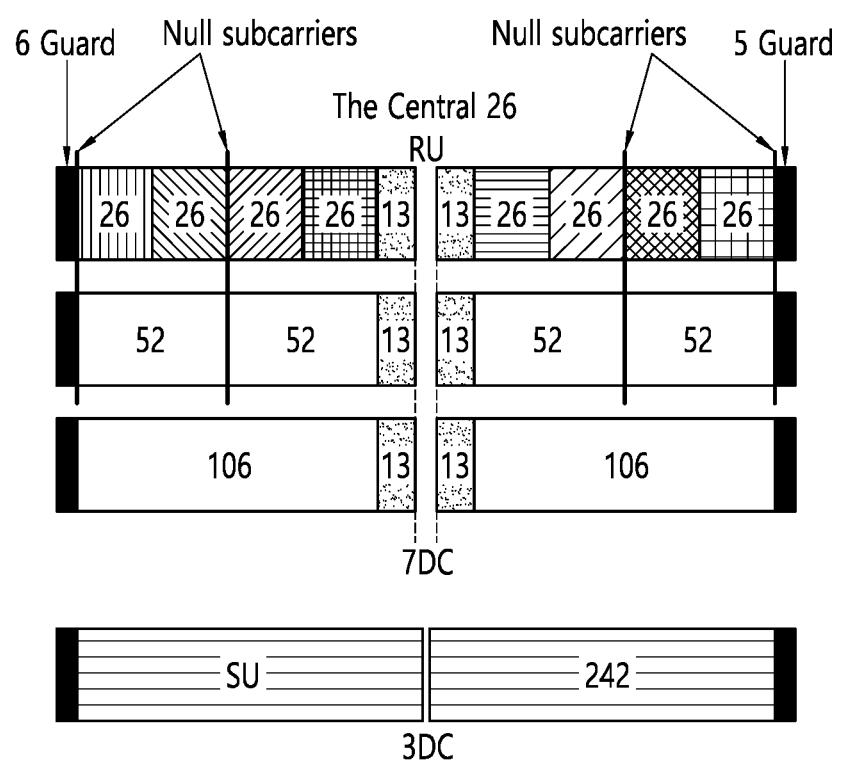
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
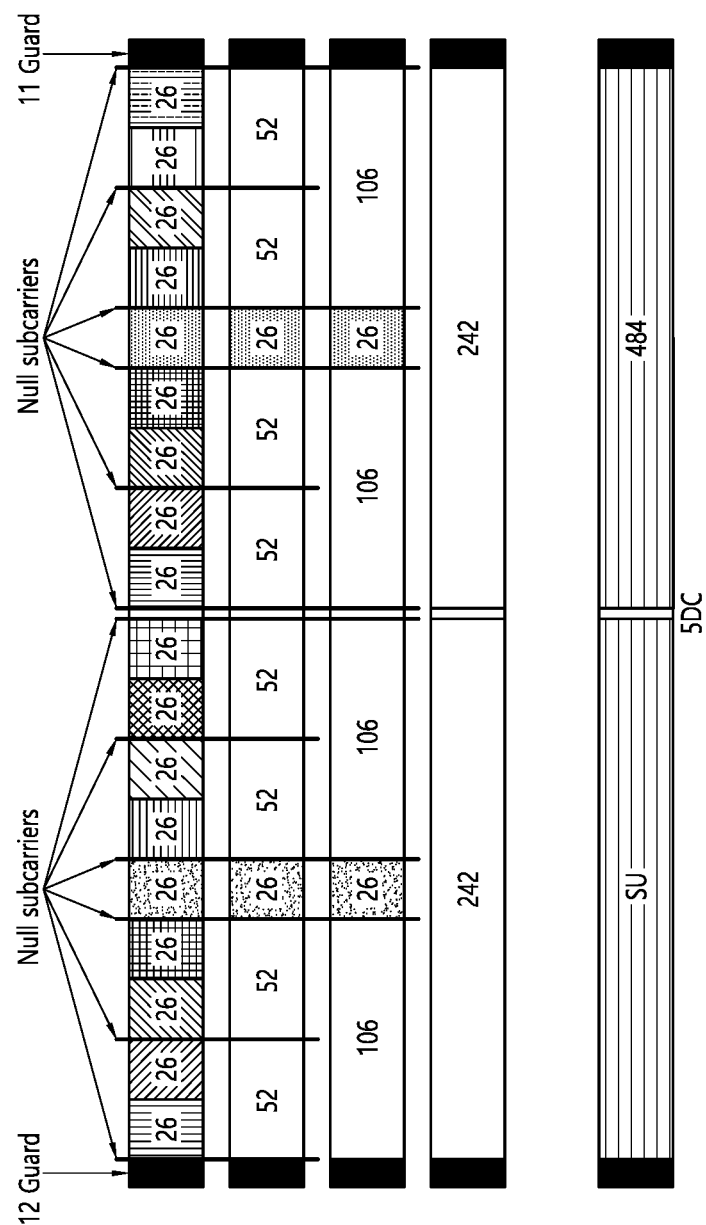
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
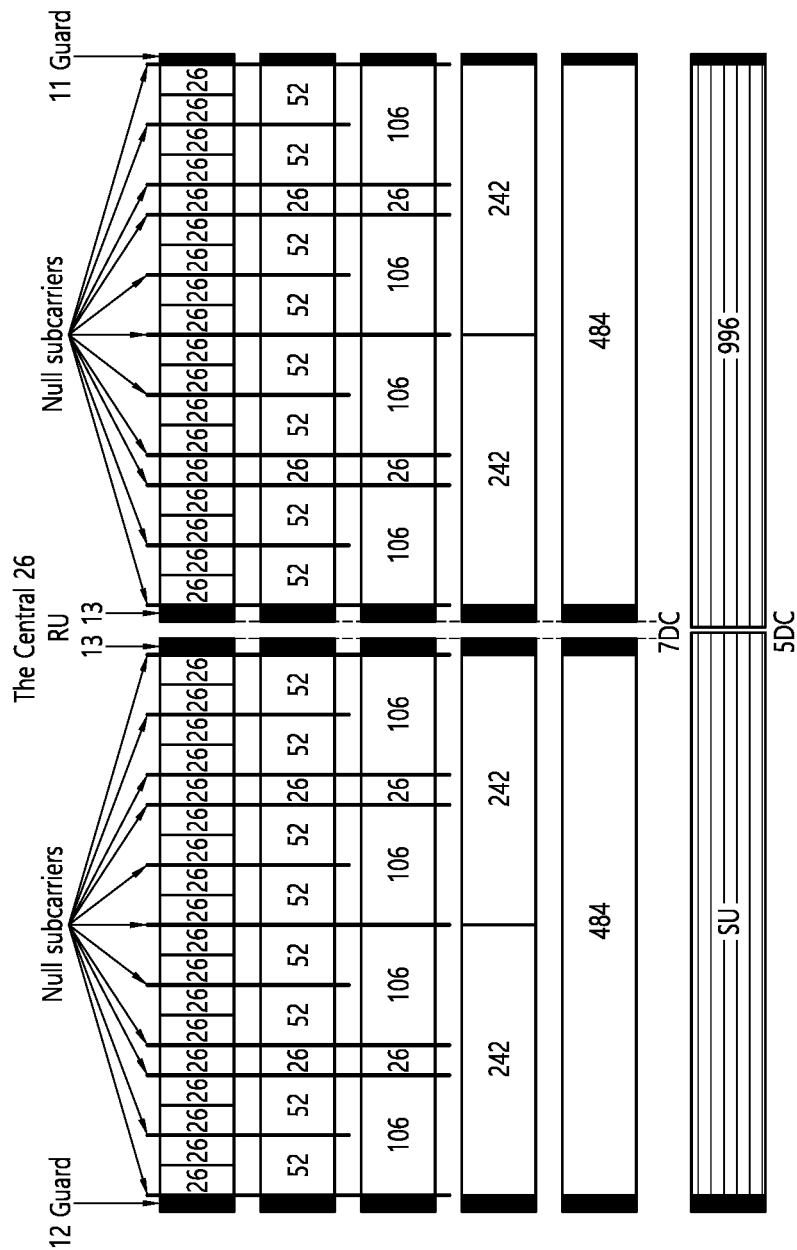
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
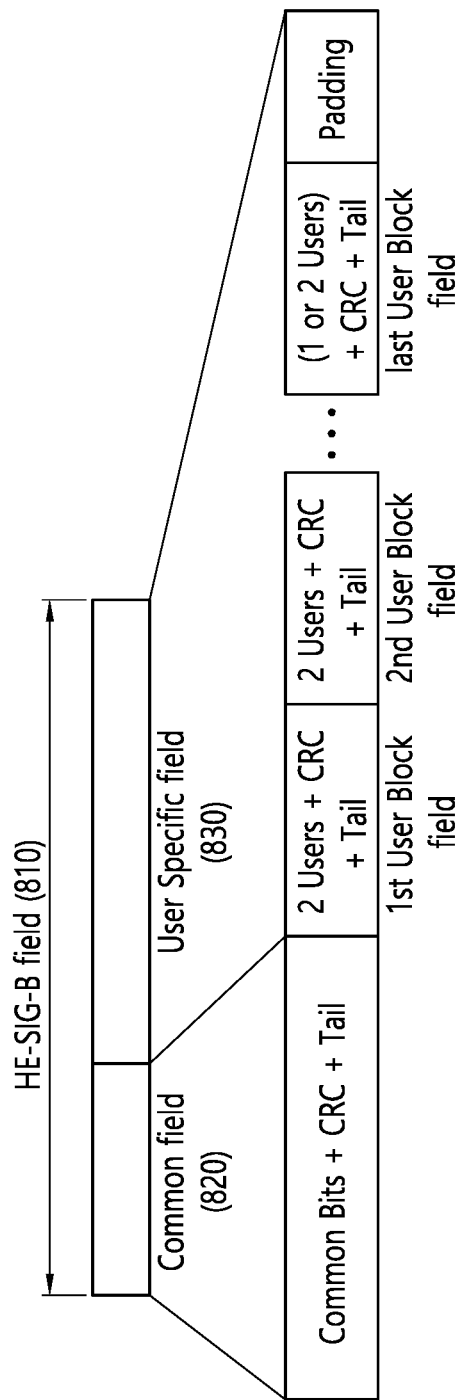
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 26 | 52 | 26 | 26 |  | 1 |
| 00000011 | 26 | 26 | 26 | 26 | 26 | 52 | 52 |  |  | 1 |
| 00000100 | 26 | 26 | 52 | 26 | 26 | 26 | 26 | 26 |  | 1 |
| 00000101 | 26 | 26 | 52 | 26 | 26 | 26 | 52 |  |  | 1 |
| 00000110 | 26 | 26 | 52 | 26 | 52 | 26 | 26 |  |  | 1 |
| 00000111 | 26 | 26 | 52 | 26 | 52 | 52 |  |  |  | 1 |
| 00001000 | 52 | 26 | 26 | 26 | 26 | 26 | 26 | 26 |  | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ |  | 106 |  | 26 | 26 | 26 | 26 | 26 |  | 8 |
| 01001$y_2y_1y_0$ |  | 106 |  | 26 | 26 | 26 | 52 |  |  | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
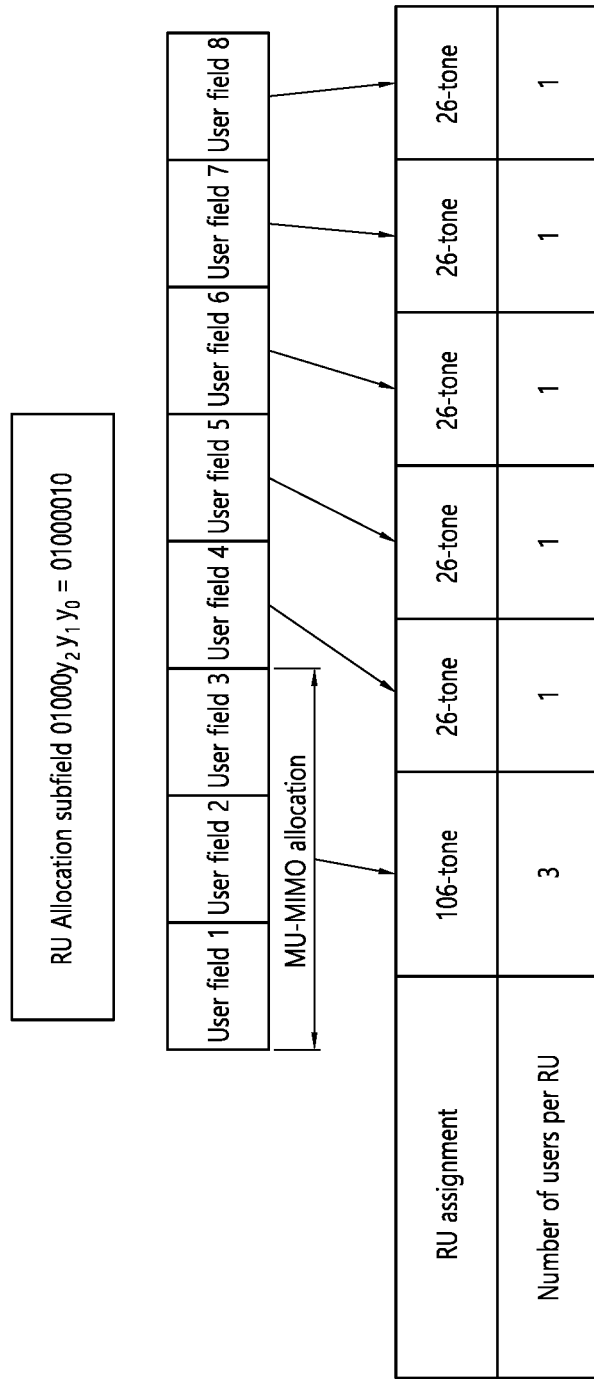
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
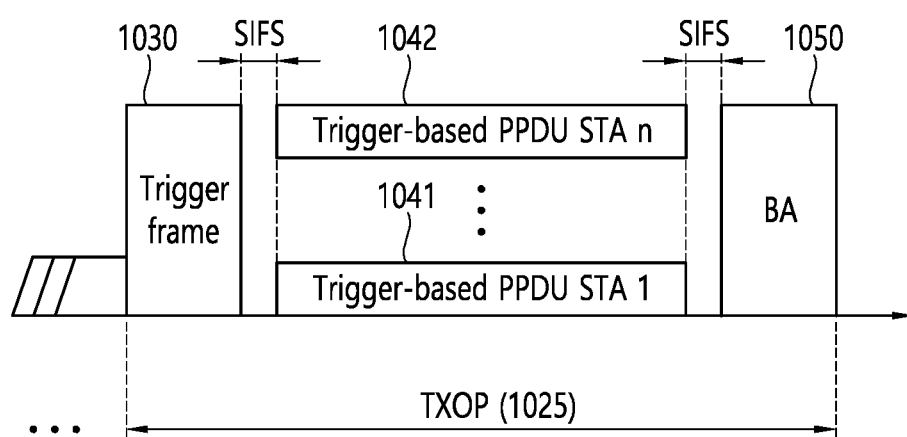
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
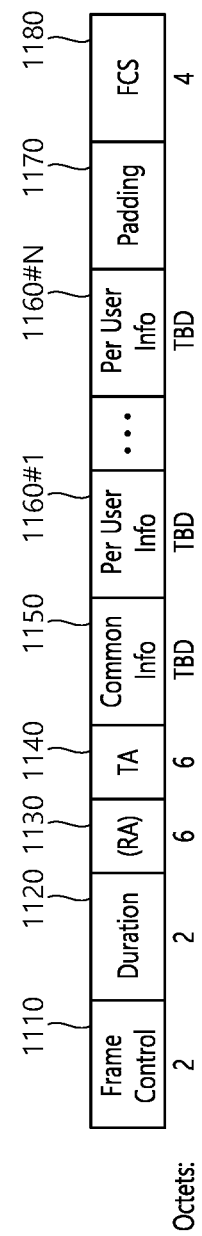
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160#1 to 1160#N shown in FIG. 11 may include a plurality of subfields.

Figure 12:
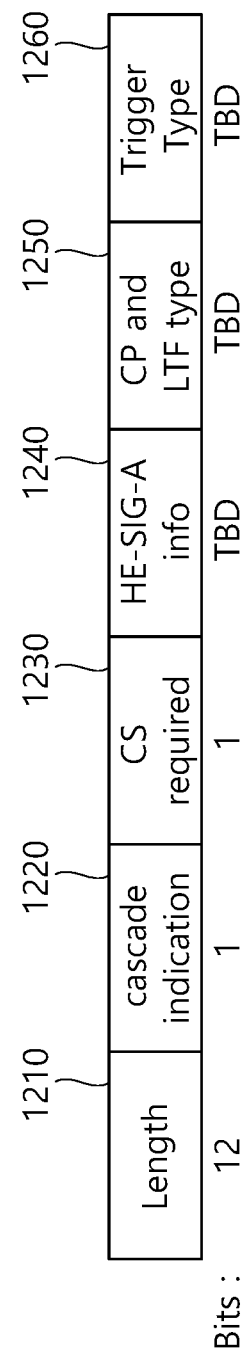
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
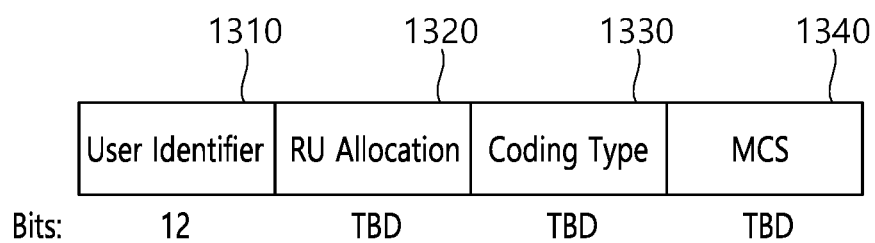
FIG. 13 illustrates an example of a subfield included in a per user information field.

FIG. 13 illustrates an example of a subfield included in a per user information field. A user information field 1300 of FIG. 13 may be understood as any one of the per user information fields 1160#1 to 1160#N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
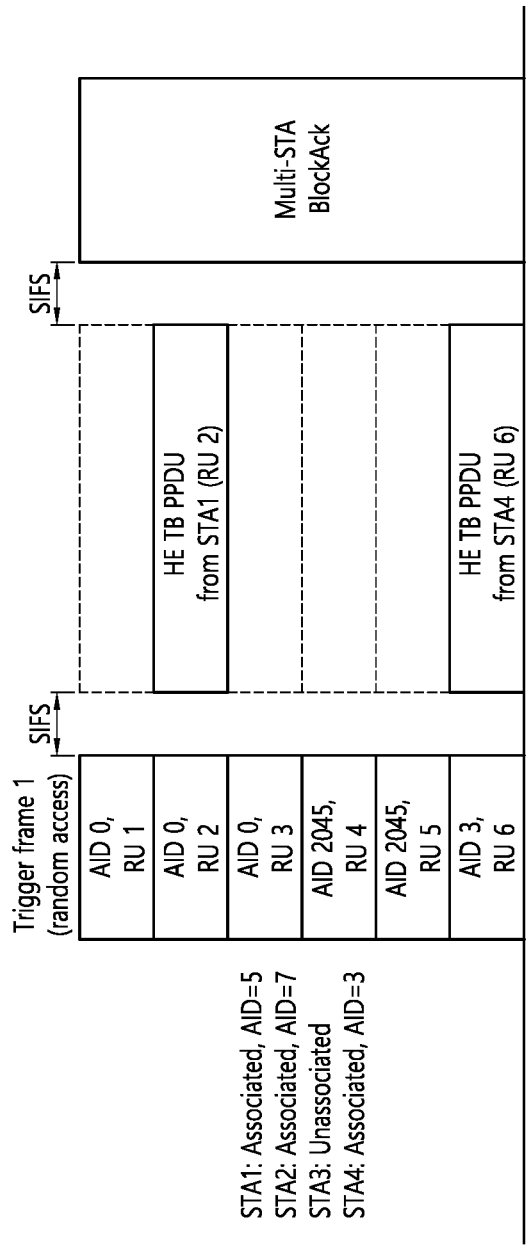
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
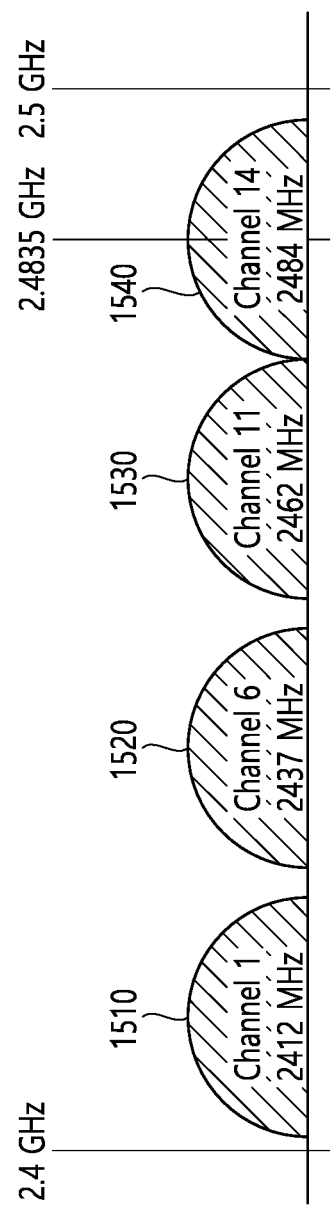
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
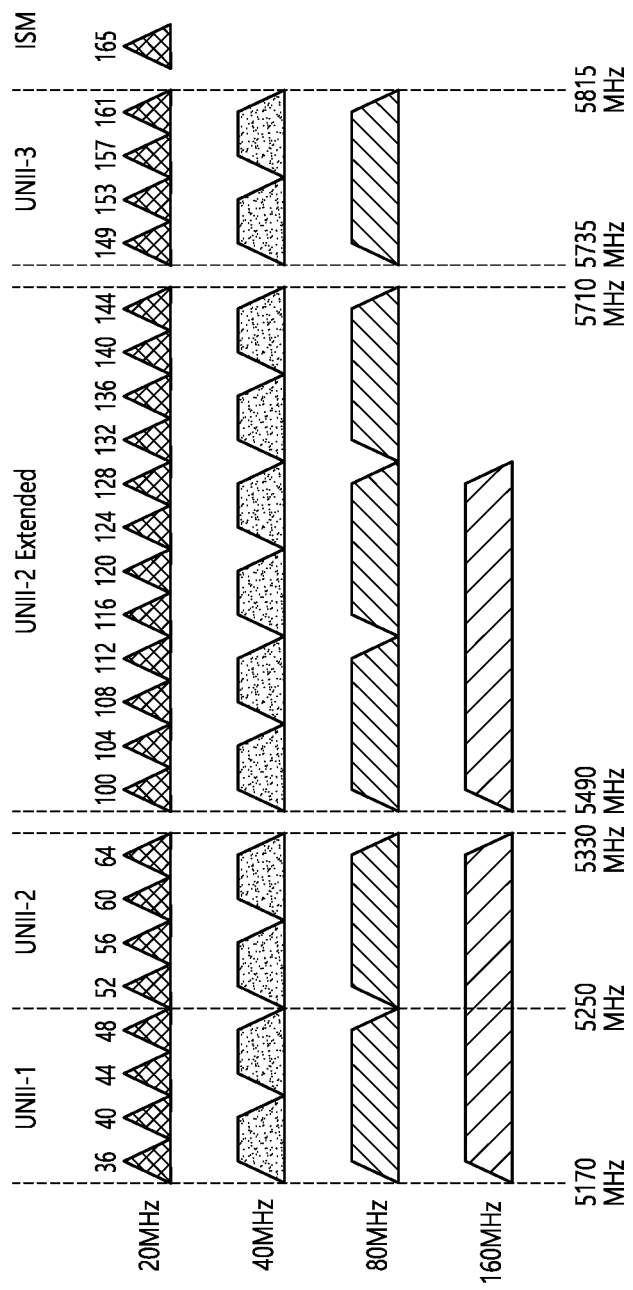
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
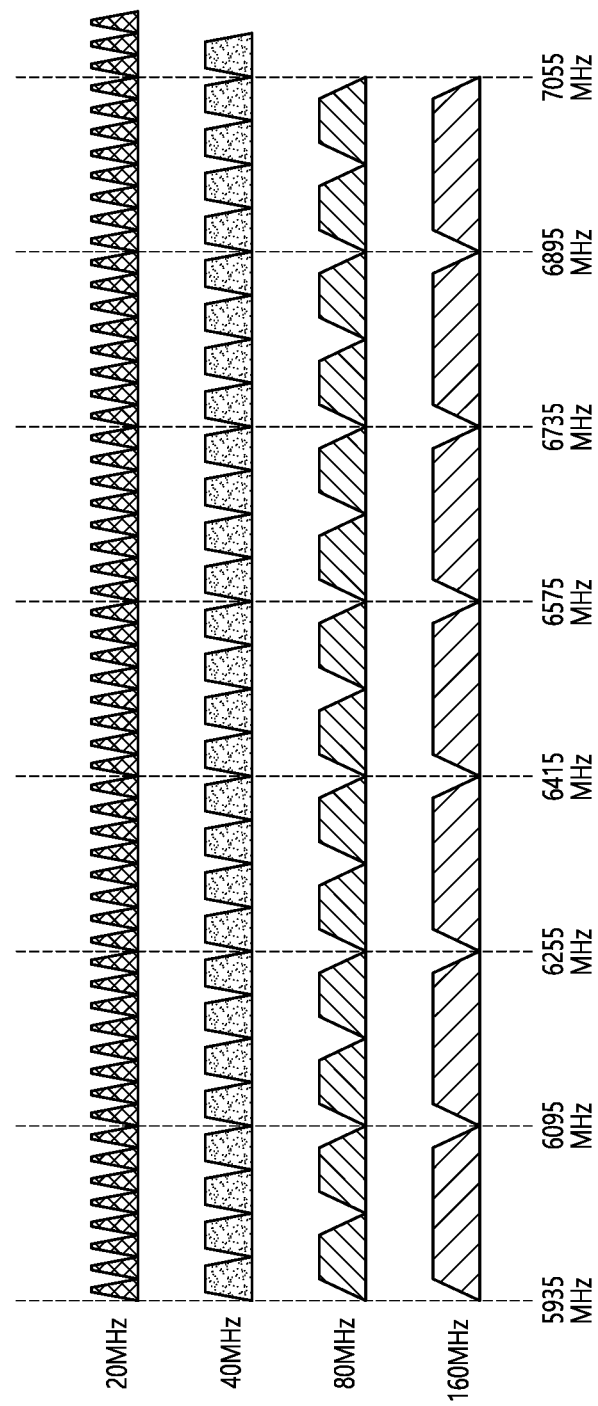
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | | 52 | | 26 | 26 | 26 | 26 | 1 |
| 5 | 26 | 26 | | 52 | | 26 | 26 | 26 | 52 | 1 |
| 6 | 26 | 26 | | 52 | | 26 | 52 | | 26 | 26 | 1 |
| 7 | 26 | 26 | | 52 | | 26 | 52 | | 52 | | 1 |
| 8 | | 52 | | 26 | 26 | 26 | 26 | 26 | 26 | 1 |
| 9 | | 52 | | 26 | 26 | 26 | 26 | 26 | 52 | 1 |
| 10 | | 52 | | 26 | 26 | 26 | 52 | | 26 | 26 | 1 |
| 11 | | 52 | | 26 | 26 | 26 | 52 | | 52 | | 1 |
| 12 | | 52 | | | 52 | | 26 | 26 | 26 | 26 | 1 |
| 13 | | 52 | | | 52 | | 26 | 26 | 26 | 52 | 1 |
| 14 | | 52 | | | 52 | | 26 | 52 | | 26 | 26 | 1 |
| 15 | | 52 | | | 52 | | 26 | 52 | | 52 | | 1 |
| 16 | 26 | 26 | 26 | 26 | 26 | | 106 | | | 1 |
| 17 | 26 | 26 | | 52 | | 26 | | 106 | | | 1 |
| 18 | | 52 | | 26 | 26 | 26 | | 106 | | | 1 |
| 19 | | 52 | | | 52 | | 26 | | 106 | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | 26 | 26 | 26 | 26 | 26 | 1 |
| 21 | | 106 | | 26 | 26 | 26 | 52 | | 1 |
| 22 | | 106 | | 26 | 52 | | 26 | 26 | 1 |
| 23 | | 106 | | 26 | 52 | | 52 | | 1 |
| 24 | 52 | | 52 | | — | | 52 | | 52 | | 1 |
| 25 | 242-tone RU empty (with zero users) | | | | | | | | | 1 |
| 26 | | 106 | | 26 | | 106 | | | 1 |

TABLE 6-continued

| Indices | #1 | #2 | #3 | #4 | #5 | #6 | #7 | #8 | #9 | Number of entries |
|---|---|---|---|---|---|---|---|---|---|---|
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 26 | 1 |
| 61 | 26 | | 26 + 52 | | 26 | 26 | 26 | | 52 | 1 |
| 62 | 26 | | 26 + 52 | | 26 | 52 | | 26 | 26 | 1 |
| 63 | 26 | 26 | | 52 | | 26 | 52 + 26 | | 26 | 1 |
| 64 | 26 | | 26 + 52 | | 26 | 52 + 26 | | 26 | 1 |
| 65 | 26 | | 26 + 52 | | 26 | 52 | | 52 | 1 |

TABLE 7

| | #1 | #2 | #3 | #4 | #5 | #6 | #7 | #8 | #9 | Number |
|---|---|---|---|---|---|---|---|---|---|---|
| 66 | 52 | | 26 | 26 | 26 | 52 + 26 | | 26 | 1 |
| 67 | 52 | | | 52 | | 26 | 52 + 26 | | 26 | 1 |
| 68 | 52 | | | 52 + 26 | | 52 | | 52 | 1 |
| 69 | 26 | 26 | 26 | 26 | | 26 + 106 | | | 1 |
| 70 | 26 | | 26 + 52 | | 26 | | 106 | | | 1 |
| 71 | 26 | 26 | | 52 | | | 26 + 106 | | | 1 |
| 72 | 26 | | 26 + 52 | | | 26 + 106 | | | 1 |
| 73 | 52 | | 26 | 26 | | 26 + 106 | | | 1 |
| 74 | 52 | | | 52 | | | 26 + 106 | | | 1 |
| 75 | | 106 + 26 | | 26 | 26 | 26 | 26 | 1 |
| 76 | | 106 + 26 | | 26 | 26 | | 52 | 1 |
| 77 | | 106 + 26 | | | 52 | | 26 | 26 | 1 |
| 78 | | 106 | | 26 | 52 + 26 | | 26 | 1 |
| 79 | | 106 + 26 | | | 52 + 26 | | 26 | 1 |
| 80 | | 106 + 26 | | | 52 | | 52 | 1 |
| 81 | | 106 + 26 | | | | 106 | | 1 |
| 82 | | 106 | | | 26 + 106 | | | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad <\text{Equation 1}>$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( )implies a square root. In addition, j implies an imaginary number.

$$\text{EHT-STF}(-112:16:112)=\{M\}*(1+j)/\text{sqrt}(2) \quad <\text{Equation 2}>$$

EHT-STF(0)=0

The EHT-STF for the 40 MHz PPDU may be configured based on the following equation. The following example may be the first type (i.e., 1×STF) sequence.

$$\text{EHT-STF}(-240:16:240)=\{M,0,-M\}*(1+j)/\text{sqrt}(2) \quad <\text{Equation 3}>$$

The EHT-STF for the 80 MHz PPDU may be configured based on the following equation. The following example may be the first type (i.e., 1×STF) sequence.

$$\text{EHT-STF}(-496:16:496)=\{M,1,-M,0,-M,1,-M\}*(1+j)/\text{sqrt}(2) \quad <\text{Equation 4}>$$

The EHT-STF for the 160 MHz PPDU may be configured based on the following equation. The following example may be the first type (i.e., 1×STF) sequence.

$$\text{EHT-STF}(-1008:16:1008)=\{M,1,-M,0,-M,1,-M,0,-M,-1,M,0,-M,1,-M1\}*(1+j)/\text{sqrt}(2) \quad <\text{Equation 5}>$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496:16:496)=\{-M,-1,M,0,-M,1,M\}*(1+j)/\text{sqrt}(2) \quad <\text{Equation 6}>$$

Equation 7 to Equation 11 below relate to an example of a second type (i.e., 2×STF) sequence.

$$\text{EHT-STF}(-120:8:120)=\{M,0,-M\}*(1+j)/\text{sqrt}(2) \quad <\text{Equation 7}>$$

The EHT-STF for the 40 MHz PPDU may be configured based on the following equation.

$$\text{EHT-STF}(-248:8:248)=\{M,-1,-M,0,M,-1,M\}*(1+j)/\text{sqrt}(2) \quad <\text{Equation 8}>$$

EHT-STF(−248)=0
EHT-STF(248)=0

The EHT-STF for the 80 MHz PPDU may be configured based on the following equation.

$$\text{EHT-STF}(-504:8:504)=\{M,-1,M,-1,-M,-1,M,0,-M,1,M,1,-M,1,-M\}*(1+j)/\text{sqrt}(2) \quad <\text{Equation 9}>$$

The EHT-STF for the 160 MHz PPDU may be configured based on the following equation.

$$\text{EHT-STF}(-1016:16:1016)=\{M,-1,M,-1,-M,-1,M,0,-M,1,M,1,-M,1,-M,0,-M,1,-M,1,M,1,-M,0,-M,1,M,1,-M\}*(1+j)/\text{sqrt}(2) \quad <\text{Equation 10}>$$

EHT-STF(−8)=0, EHT-STF(8)=0,
EHT-STF(−1016)=0, EHT-STF(1016)=0

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504:8:504)=\{-M,1,-M,1,M,1,-M,0,-M,1,M,1,-M,1,-M\}*(1+j)/\text{sqrt}(2) \quad <\text{Equation 11}>$$

EHT-STF(−504)=0,
EHT-STF(504)=0

The EHT-LTF may have first, second, and third types (i.e., 1×, 2×, 4× LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
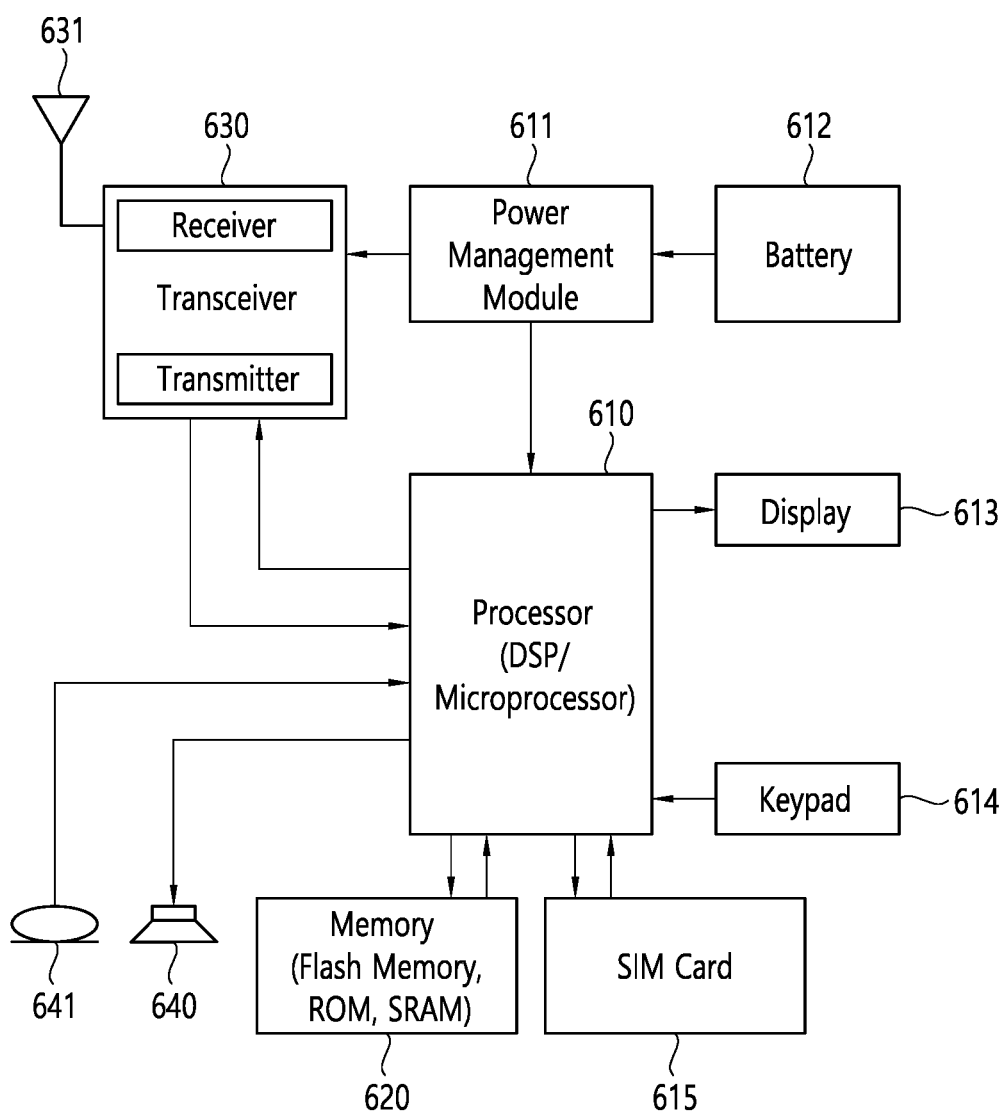
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 20:
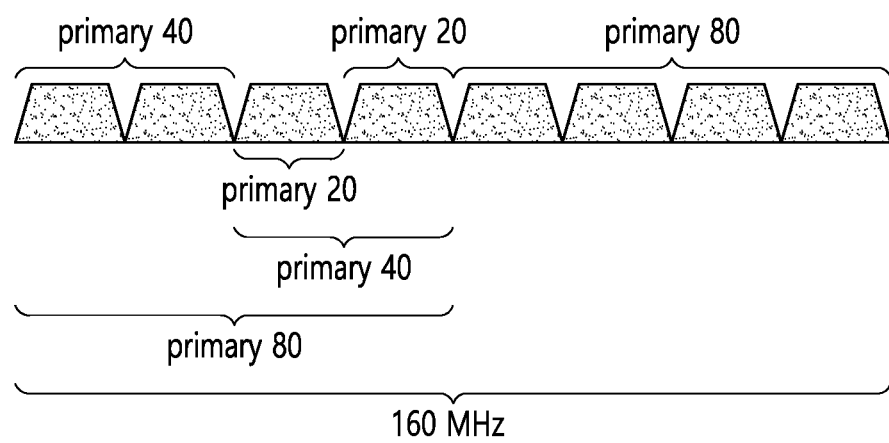
FIG. 20 shows an example of channel bonding.

FIG. 20 shows an example of channel bonding. As shown in FIG. 20, the primary 20 MHz channel and the secondary 20 MHz channel may make up a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the Primary 20 MHz channel, the Secondary 20 MHz channel, the Secondary 40 MHz channel, and the Secondary 80 MHz channel can be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by an STA in the present disclosure will be described.

For example, in the example of FIG. 20, if the Primary 20 MHz channel, the Secondary 40 MHz channel, and the Secondary 80 MHz channel are all in the idle state, but the Secondary 20 MHz channel is in the busy state, bonding to the secondary 40 MHz channel and the secondary 80 MHz channel may not be possible. In this case, the STA may configure a 160 MHz PPDU and may perform a preamble puncturing on the preamble transmitted through the secondary 20 MHz channel (for example, L-STF, L-LTF, L-SIG, RL-SIG, U-SIG, HE-SIG-A, HE-SIG-B, HE-STF, HE-LTF, EHT-SIG, EHT -STF, EHT-LTF, etc.), so that the STA may transmit a signal through a channel in the idle state. In other words, the STA may perform preamble puncturing for some bands of the PPDU. Information on preamble puncturing (for example, information about 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by an STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 15, the 5 GHz band shown in FIG. 16, and the 6 GHz band shown in FIG. 17 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink link. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

In extreme high throughput (EHT), a standard being discussed after IEEE802.11ax, the introduction of HARQ is being considered. When HARQ is introduced, coverage can be expanded in a low signal to noise ratio (SNR) environment, that is, in an environment where the distance between the transmitting terminal and the receiving terminal is long, and higher throughput may be obtained in a high SNR environment.

The device described below may be the apparatus of FIGS. 1 and/or 19, and the PPDU described below may be the PPDU of FIG. 18. The device may be an AP or a non-AP STA.

EHT (IEEE802.11be) can support not only the 160 MHz bandwidth that has been supported up to IEEE802.11ax, but also larger bandwidths of 240 MHz and 320 MHz. The 240 MHz bandwidth may be defined as one bandwidth of 11be, or may be configured by puncturing (e.g., preamble puncturing (PP)) 80 MHz in 320 MHz. This may affect 320 MHz/240 MHz BSS configuration. When the 240 MHz is configured by applying puncturing a part of 320 MHz, possible combinations should be indicated in the PHY header, but information related to the puncturing may be signaled in the MAC in order to reduce signaling overhead in the PHY. Hereinafter, MAC signaling for a case in which one bandwidth is defined to support 240 MHz and a case in which 240 MHz is defined by puncturing a part of 320 MHz will be described.

In 11be, a 240 MHz bandwidth may be newly defined, or a 240 MHz bandwidth may be configured by applying puncturing (e.g., PP) in 320 MHz.

1. When defining a 240 MHz bandwidth (e.g., defining a channelization for 240 MHz)

It may be assumed that the 240 MHz consists of Primary 80 (P80), Secondary 80-1 (S80-1), and Secondary 80-2 (S80-2) and the 320 MHz consists of P80, S80-1, S80-2, and S80-3. 'P80+S80-1' may be expressed as 'P160', 'P80+S80-1+S80-2' may be expressed as 'P240', and 'S80-2+S80-3' may be expressed as 'S160'.

If the 240 MHz bandwidth is defined, the AP should announce BSS channel information for the 240 MHz of one link. The BSS channel information may be configured as follows, but is not limited thereto.

Link identifier (in case of multi-link): As an identifier that can distinguish each link, the AP can newly define an identifier for each link. Alternatively, the AP may define a link identifier based on an existing BSSID, BSS Color, or the like.

Ex) New identifier: 0, 1, 2, . . .

Band Information: The band information may be related to a band (e.g., 2.4 GHz, 5 GHz, 6 GHz, etc.) in which the multi-link operation is performed/possible. Specifically, the Band Information may be an ID (or a Band ID field of the existing spec, etc.) that can distinguish a band in which the EHT operates, but the Band Information is not limited thereto.

Ex 1) Band ID: "0" for 2.4 GHz, "1" for 5 GHz, "2" for 6 GHz, . . .

Ex 2) Band ID field: "2" for 2.4 GHz, "4" for 5 GHz, "7" for 6 GHz, . . .

Primary channel: Primary channel number of the corresponding link channel

Channel Width: Channel bandwidth of the link channel (e.g., 240 MHz, 80 MHz+160 MHz, 320 MHz, 160 MHz+160 MHz, etc.)

Channel Center Frequency Segment (CCFS) 0 : Channel Center Frequency index of P80. That is, the channel center frequency index of the primary 80 MHz channel CCFS1: Channel Center Frequency index of the 'S80'-1 or 'P160'. That is, the channel center frequency index of the secondary '80-1' channel The 240 MHz may be configured as 'contiguous 240 MHz', '80+160 MHz', or '160+80 MHz'. In order to express all combinations, additional CCFS2 may be required. That is, according to the CCFS2 indication, the channel combination of 240 MHz can be signaled. The 240 MHz may be configured by puncturing 80 MHz in 320 MHz.

CCFS2: Channel Center Frequency index of 'S80'-2 or 'P240' (Channel Center frequency index of P320 or S160 for 320 MHz transmission)

For example, the channel center frequency index may be an index assigned to each channel, and channels having an index value different by '1' may have a center frequency different by 5 MHz. For example, having a difference of '16' between the CCFS2 and the CCFS1 in the 320 MHz channel may mean that the center frequency of the CCFS2 (i.e., the center frequency of the 320 MHz channel) and the center frequency of the primary 160 MHz channel are separated by 80 MHz.

The BSS channel information need not include all of the above subfields/information.

FIG. 21 is a diagram illustrating an embodiment in which CCFS is defined.

Referring to FIG. 21, '240 MHz', '80 MHz+160 MHz'/'160 MHz+80 MHz', '320 MHz', and '160 MHz+160 MHz' may be expressed as a combination of CCFS0 to CCFS2.

For example, in 320 MHz, CCFS0 may indicate a channel center frequency index of a primary 80 MHz channel, CCFS1 may indicate a channel center frequency index of a primary 160 MHz channel, and CCFS2 may indicate a channel center frequency of a 320 MHz channel. For example, the CCFS1 and CCFS2 may be greater than '0', and the difference between CCFS1 and CCFS0 may be '8'. The difference between the CCFS1 and the CCFS0 of '8' may mean that the channel center frequency of the primary 80 MHz channel and the channel center frequency of the primary 160 MHz channel are 40 MHz apart. For example, the difference between CCFS2 and CCFS1 may be '16'. The difference between CCFS2 and CCFS1 of '16' may mean that the channel center frequency of the primary 160 MHz channel and the channel center frequency of the 320 MHz channel are separated by 80 MHz.

For example, in '160 MHz+160 MHz', the CCFS0 may indicate a channel center frequency index of a primary 80 MHz channel, the CCFS1 may indicate a channel center frequency index of a primary 160 MHz channel, and the CCFS2 may indicate a channel center frequency index of a secondary 160 MHz channel. For example, the CCFS1 and CCFS2 may be greater than '0', and the difference between the CCFS1 and CCFS0 may be '8'. The difference between CCFS0 and CCFS1 of 8 may mean that the channel center frequency of the primary 80 MHz channel and the channel center frequency of the primary 160 MHz channel are 40 MHz apart. For example, the difference between the CCFS2 and CCFS1 may be greater than '32'. A difference between the CCFS2 and CCFS1 greater than 32 may mean that the channel center frequency of the secondary 160 MHz channel and the channel center frequency of the primary 160 MHz channel are more than 160 MHz apart.

If 240 MHz is defined, puncturing within 240 MHz can be considered additionally. Assuming that CCA (clear channel assessment) is performed in units of 20 MHz for a maximum bandwidth (BW) of 240/320 MHz, 12-bit/16-bit may be used to indicate the puncturing pattern. The number of bits may vary according to the maximum bandwidth and CCA units. Hereinafter, it will be described based on CCA in units of 20 MHz.

Method-1) Puncturing Bitmap for 240 MHz

Ex 1) For example, a 12-bit bitmap capable of indicating each punctured 20 MHz may be used for 240 MHz puncturing information. For example, since Primary 20 should not be punctured, only 11-bitmap except the Primary 20 may be used in 12-bit bitmap. For example, a 10-bit bitmap may be used. For example, assuming that neither the primary 20 nor the secondary 20 are punctured at the same time, a 10-bit bitmap may be used for further reducing 1 bit.

240 MHz Puncturing (0000 1100 0000)

The above example is an example of 240 MHz puncturing 12bit. As mentioned above, the preceding "0000" (Primary 80) may be indicated as "000" or "00" to reduce overhead. For example, "0" may indicate an unpunctured 20 MHz portion and "1" may indicate a punctured 20 MHz portion. The second 80 MHz segment may include information that the upper 484RU is punctured through "1100".

Method-2) Additional index for Puncturing pattern for 240 MHz

FIG. 22 is a diagram illustrating an embodiment of a puncturing pattern.

Referring to FIG. 22, 240 MHz puncturing information may require bits capable of indicating as many as the number of patterns if a puncturing pattern is determined. If the puncturing pattern is determined as shown in FIG. 22, since there are 10 puncturing patterns, 4 bits may be required to index the puncturing patterns. That is, the number of bits for the puncturing pattern may vary depending on how a possible puncturing pattern is defined.

Basically, the overhead can be reduced compared to Method-1) (i.e., the puncturing pattern bitmap method), but it can be dependent on the puncturing pattern in the PHY layer (i.e., the flexibility in the MAC can be reduced).

240 MHz Puncturing (0100)

The above is an example of 240 MHz puncturing 4 bit (using puncturing pattern index) indication. 'Value 4' (i.e., 'puncturing pattern 4') may mean [xxoo oooo oooo] in FIG. 22 and may be related to a puncturing pattern index of "0100". For example, 'value 0' may be the first puncturing pattern, 'value 1' may be the second puncturing pattern, and 'value 4' may be the fifth puncturing pattern. For example, when the puncturing pattern is [oooo oooo] (i.e., 'value 0'), the puncturing pattern index may be "0000."

Methods to consider dynamic indications for Method-1) to Method-2)

Method-1) to Method-2) can be used statically, but in order to reduce overhead, the puncturing method can be dynamically instructed through an indication of whether information corresponding to Method-1) to Method-2) exists.

That is, it is possible to indicate whether or not puncturing of the BSS configuration exists. For example, information related to the presence or absence of puncturing information may be transmitted through the "puncturing information present" field (or a field with different title) having a length of 1 bit before performing signaling based on Method-1) to Method-2). For example, '0' may include information indicating that puncturing information is not included. For example, '1' may include information that includes puncturing information, and may include indication discussed in Method-1) to Method-2).

2. Case where 240 MHz Bandwidth is supported by puncturing (e.g., Preamble Puncturing) in 320 MHz Basically, in order to support 240 MHz by puncturing (e.g., PP) in 320 MHz, an 80 MHz should be punctured in the 320 MHz. In particular, the 240 MHz should include Primary 20 (P20). In addition, since the 240 MHz is highly likely to be composed of three 80 MHz segments from the viewpoint of the tone plan, MAC signaling for puncturing is proposed based on the 80 MHz unit. The puncturing signaling information may be basically included in an existing management frame such as Beacon/Probe Request, response/Association request/response, etc., and may also be included in a control frame/field, etc.

320 MHz may be configured as follows.

Figure 23:
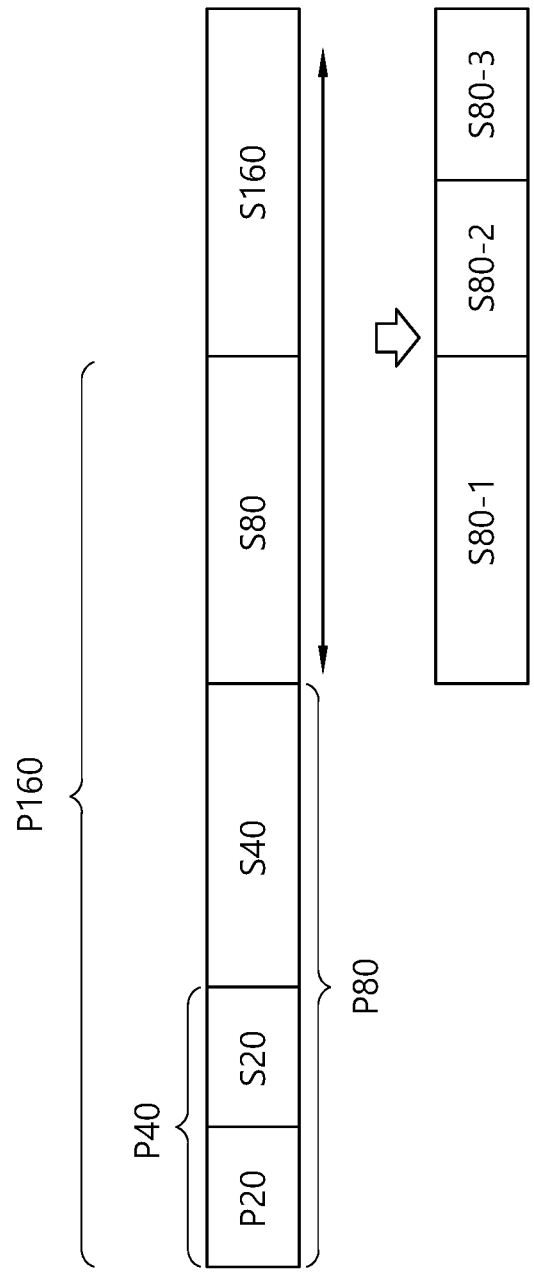
FIG. 23 is a diagram illustrating an embodiment of a 320 MHz channel configuration.

FIG. 23 is a diagram illustrating an embodiment of a 320 MHz channel configuration.

Referring to FIG. 23, since P20 must always be included, P80 must be included in the 80 MHz units. Therefore, the following combination may exist for 240 MHz (i.e., indicating a punctured 80Hz position).

A. 240 MHz excluding 'S80'-1 within 320 MHz
B. 240 MHz excluding 'S80'-2 within 320 MHz
C. 240 MHz excluding 'S80'-3 within 320 MHz The puncturing information may be expressed and transmitted as follows, but is not limited thereto.

Bitmap: It is used as a selection of supported combinations or one or more combinations Ex) 3bit=>100:240 MHz uses Method A (i.e., indicates a location of punctured 80 Hz). That is, 'S80'-1 is punctured.

Bit combination: It is used as a combination selection (i.e. using index).

Ex) 2bit=>'00' for 'Method A', '01' for 'Method B', '10' for 'Method C' (i.e., define what the index means). That is, '00' for 'S80'-1 puncturing, '01' for 'S80'-2 puncturing, and '11' for 'S80'-3 puncturing.

In addition to the 240 MHz indication, puncturing within 320 MHz may be considered. In the case of the maximum bandwidth (BW) of 320 MHz, 16 bits can be used for puncturing information assuming CCA is performed in units of 20 MHz. However, the number of bits for puncturing information may vary according to the maximum bandwidth and CCA units. Hereinafter, the following features are based on a bandwidth of 320 MHz and 20 MHz CCA units.

Method-1) Explicit Indication for 240 MHz+Puncturing Bitmap for 320 MHz

Basically, the 240 MHz indication may indicate a punctured 80 MHz part as a bitmap or use an indexing method.

Ex 1) For 320 MHz puncturing information, a 16-bit bitmap capable of indicating each punctured 20 MHz may be used. For example, since Primary 20 should not be punctured, only 15-bitmaps except for Primary 20 may be used in the 16-bit bitmap. For example, a 14-bit bitmap may be used. For example, assuming that both the primary 20 and the secondary 20 are not punctured at the same time, a 14-bit bitmap may be used for further reducing 1 bit.

240 MHz (100)+320 MHz Puncturing (0000 1111 1100 0000)

The above is an example of 240 MHz puncturing information (bitmap) and 320 MHz puncturing 16-bit indication. The preceding "0000" (Primary 80) may be indicated as "000" or "00" to reduce overhead. "100" may include information related to 240 MHz except for S80'-1. The 320 MHz puncturing 16 bits may include information that the 'S80'-1 part is all punctured ("1111") and information that the upper 484RU is punctured through "1100" in 'S80'-2.

240 MHz (100)+320 MHz Puncturing (0000 0000 1100 0000)

The above is an example of 240 MHz puncturing information (bitmap) and 320 MHz puncturing 16-bit indication. The preceding "0000" (Primary 80) may be indicated as "000" or "00" to reduce overhead. In this example, the 240 MHz transmission method is first indicated in the 320 MHz PPDU bandwidth, and then puncturing information due to the incumbent device is indicated in the next 320 MHz. "100" may include information related to 240 MHz except for 'S80'-1. The 320 MHz puncturing 16 bits may include information ("1100") indicating that the upper 484RU is punctured in 'S80'-2.

Ex 2) A bitmap for 240 MHz excluding 80 MHz punctured within 320 MHz may be configured dynamically. For example, if 'S80'-1 is punctured, puncturing information can be configured with 12 bits except for 4 bits as much as 'S80'-1. As in Ex 1) above, since Primary 20 should not be punctured, only 11-bitmap except Primary 20 may be used in 12-bit bitmap. For example, it is assumed that both primary 20 and secondary 20 are not punctured at the same time, and only a 10-bit bitmap may be used for further reducing 1 bit. The overhead can be reduced compared to Method Ex 1).

240 MHz (100)+320 MHz Puncturing (0000 1100 0000)

The above is an example of 240 MHz puncturing information (bitmap) and 320 MHz puncturing 12-bit indication. As mentioned above, the preceding "0000" (Primary 80) may be indicated as "000" or "00" to reduce overhead. "100" may include information related to 240 MHz except for 'S80'-1. In 320 MHz puncturing, the bit of 'S80'-1 part may be excluded. Accordingly, in '0000 1100 0000', the first 4 bits ('0000') may be puncturing information of P80, the second 4 bits ('1100') may be puncturing information of 'S80'-2, and the third 4 bits ('0000') may be puncturing information of 'S80'-3. Accordingly, '1100' may include information indicating that the upper 484RU is punctured in 'S80'-2.

Method-2) Explicit indication for 240 MHz+Additional index for Puncturing pattern for 320 MHz (bit combination)

In the 240 MHz indication, as described above, a punctured 80 MHz part is indicated by a bitmap based on 3 bits (that is, a part to be punctured among three S80s except for P80) or a bit combination method may be used.

FIG. 24 is a diagram illustrating an example of a 320/160+160 MHz puncturing pattern.

The 320 MHz puncturing information may include bits capable of indicating as many as the determined number of puncturing patterns if a puncturing pattern is determined. If the puncturing pattern is determined as shown in FIG. 24, since the number of puncturing patterns is '43', 6 bits may be needed to index the puncturing patterns. That is, the number of bits constituting the puncturing information may vary depending on how a possible puncturing pattern is defined. In addition, if the number of puncturing patterns can be changed according to the previous indication of 240 MHz, the number of bits can be changed accordingly.

The bit combination method may reduce overhead compared to the bitmap method, but may be dependent on the puncturing pattern in the PHY layer (i.e., flexibility in MAC may be reduced).

240 MHz (100)+320 MHz Puncturing (001110)

The above is an example of a 240 MHz bitmap indication and a 320 MHz puncturing pattern index 6-bit (using index) indication. In this example, "100" may include information related to 240 MHz except for 'S80'-1 within 320 MHz. For example, the value '14' may mean [xxxx xxxx 0000 0000] (i.e., the 14th puncturing pattern) in FIG. 24, and the puncturing pattern index may be "001110" (i.e., the decimal number '14').

For example, 'value 1' may mean [0000 0000 0000 0000] (i.e., the first puncturing pattern) in FIG. 24, and the puncturing pattern index may be "000001" (i.e., decimal number '1').

Method-3) Implicit indication for 240 MHz+Puncturing bitmap for 320 MHz

The 240 MHz indication can be implicitly interpreted according to how 320 MHz puncturing is indicated. That is, it is not separately indicated for 240 MHz. Basically, the puncturing instruction method for 320 MHz may be the same as "1) Explicit indication for 240 MHz+Puncturing bitmap for 320 MHz" method. If an interpretation of 240 MHz is necessary, the overhead can be reduced compared to the "1) Explicit indication for 240 MHz+Puncturing bitmap for 320 MHz" method. If the interpretation of 240 MHz is unnecessary, it can be expressed simply as puncturing information for 320 MHz without a separate instruction for 240 MHz.

Ex 1) For 320 MHz puncturing information, a 16-bit bitmap capable of indicating each punctured 20 MHz may be used. Also, if the 80 MHz segment is completely punctured, it can be interpreted as 240 MHz except for the punctured 80 MHz in 320 MHz. For example, since Primary 20 should not be punctured, only 15-bitmaps except for Primary 20 may be used in the 16-bit bitmap. For example, assuming that both the primary 20 and the secondary 20 are not punctured at the same time, a 14-bit bitmap may be used for further reducing 1 bit.

320 MHz Puncturing (0000 1111 0000 1100)

The above is an example of 320 MHz puncturing 16 bits. The preceding "0000" (Primary 80) may be indicated as "000" or "00" to reduce overhead. In this example, in 320 MHz puncturing, it basically indicates that all of the 'S80'-1 part is punctured. For this reason, it is interpreted as 240 MHz except for 'S80'-1 in 320 MHz, and "1100" may include information that the upper 484RU is punctured in 'S80'-3.

Method-4) Additional index for implicit indication+Puncturing pattern for 320 MHz for 240 MHz The 240 MHz indication can be implicitly interpreted according to how 320 MHz puncturing is indicated. That is, the 240 MHz may not be separately indicated. The puncturing instruction method for 320 MHz may be the same as the Method-2 (Method-2 "Explicit indication for 240 MHz+Additional index for Puncturing pattern for 320 MHz (bit combination)"). If the interpretation of 240 MHz is necessary, the overhead can be reduced compared to the Method-2 (Method-2 "Explicit indication for 240 MHz+Additional index for Puncturing pattern for 320 MHz (bit combination)"). If the interpretation of 240 MHz is unnecessary, it can be expressed simply as puncturing information for 320 MHz without a separate instruction for 240 MHz.

320 MHz Puncturing (001110)

The above is an example of a 320 MHz puncturing pattern 6-bit (using index) indication. If 'value 20' means [xxxx xx00 0000 0000] in FIG. 24, "010100" is indicated. Here, if the leftmost [xxxx] represents 'S80'-3, it can be interpreted as 240 MHz except for 'S80'-3.

Case Considering the Dynamic Indication for Method-1 to Method-4

Method-1) to Method-4) can be statically used, but to reduce overhead, it can be dynamically indicated through an indication of whether puncturing information corresponding to the Method-1) to Method-4) exists.

That is, it is possible to indicate whether or not puncturing of the BSS configuration exists. Therefore, the presence or absence of the puncturing information can be indicated through the "puncturing information present" field (or a field with different title) with 1 bit before performing signaling based on Method-1) to Method-4). For example, if the "puncturing information present" field value is '0', only 240 MHz instructions may be included or no information may be included. If the "puncturing information present" field value is '1', instructions included in Method-1) to Method-4) will be included.

Such information may be transmitted and negotiated in the setup process (e.g., association), and may be changed after negotiation through periodic Beacon/Probe Request/Response exchange or a control field included in a data/control frame.

If a 240 MHz combination is determined between the AP and the STA for the 240 MHz combination, 240 MHz may be transmitted in the determined combination while indicating the bandwidth information of the PHY header to 240 MHz.

Negotiation Example for 240 MHz Combination

1. AP's Confirmation (or Selection)

The STA and the AP may transmit a supportable 240 MHz combination based on information related to its capability, and the AP may select one 240 MHz combination and inform the STA.

Figure 25:
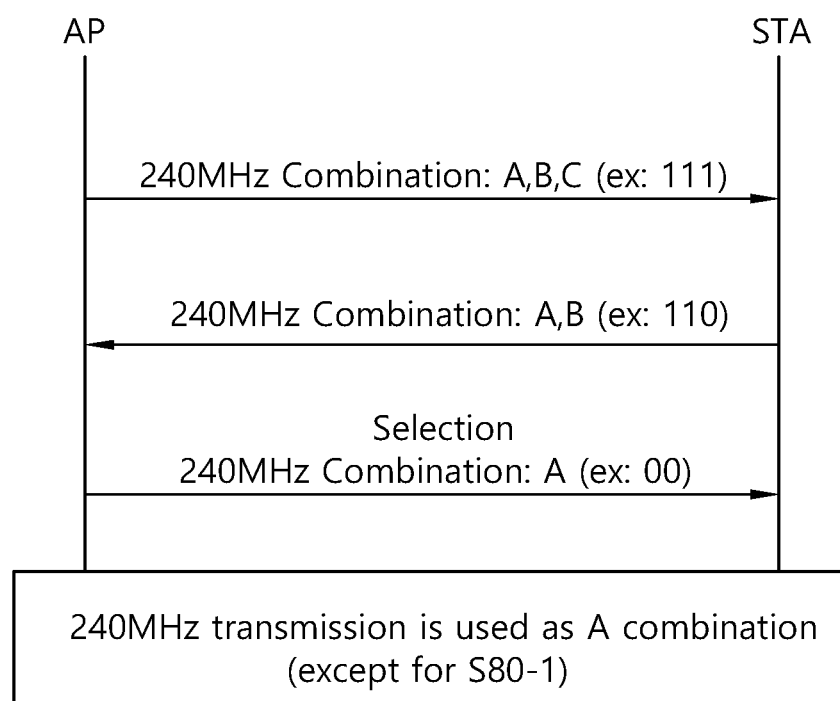
FIG. 25 is a diagram illustrating an embodiment of a transmission band negotiation method.

FIG. 25 is a diagram illustrating an embodiment of a transmission band negotiation method.

Referring to FIG. 25, when a combination of A, B, and C is possible for the AP, and a combination of A and B is possible for the STA, the AP may select a combination of A, for example, from among the possible A and B, and inform the STA. Thereafter, the STA and the AP may use the A combination when transmitting at 240 MHz. For example, the combination of A, B, and C is the 240 MHz channel combination that punctures S80-1 among 320 MHz channels, and the 240 MHz channel combination that punctures A and S80-2 punctures B, S80-3. The 240 MHz channel combination may be C.

2. STA's request+AP's response

The STA requests a 240 MHz combination and the AP responds to it.

Figure 26:
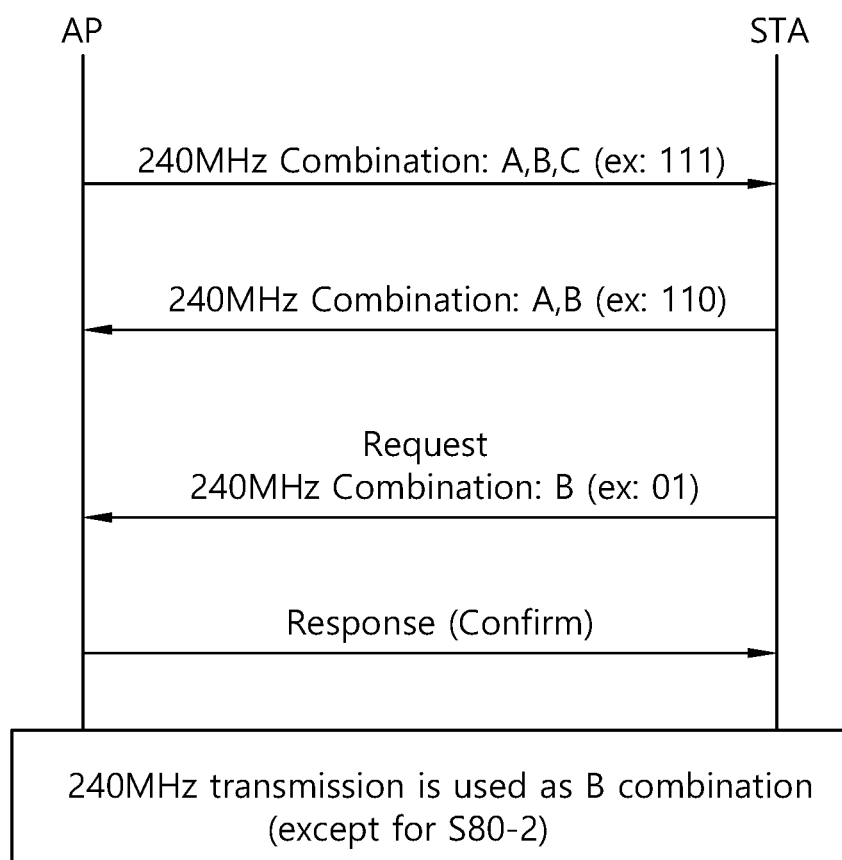
FIG. 26 is a diagram illustrating an embodiment of a transmission band negotiation method.

FIG. 26 is a diagram illustrating an embodiment of a transmission band negotiation method.

Referring to FIG. 26, when a combination of A, B, and C is possible for the AP and a combination of A and B is possible for the STA, the STA may select a combination B from among the possible combination of A and B. The STA may make a request to the AP and the AP may respond to it.

240 MHz Combination Change Example

When a certain combination is selected and an 80 MHz channel of a 240 MHz channel is congested, the 240 MHz combination may be changed.

Method-1) Use Case of Broadcast Frame (e.g., Beacon)

This method may change the unified 240 MHz combination of STAs in the BSS.

Figure 27:
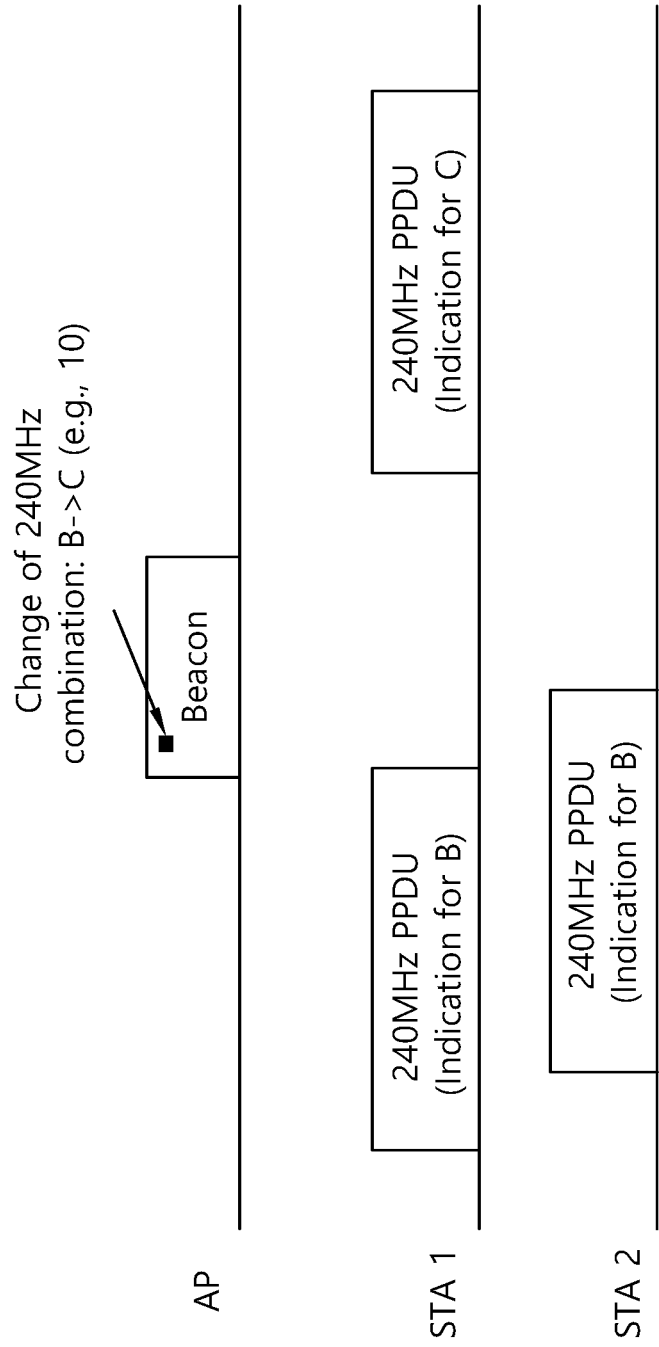
FIG. 27 is a diagram illustrating an embodiment of a method for changing a 240 MHz combination.

FIG. 27 is a diagram illustrating an embodiment of a method for changing a 240 MHz combination.

Referring to FIG. 27, when STA 1 and STA 2 are transmitting signals based on 240 MHz of combination B, the AP may instruct to change to combination C through a beacon. The indicated STA may transmit a signal based on 240 MHz of combination C. Here, the STA may not change the 240 MHz combination by transmitting a frame indicating combination B as in the following Method-2.

Method-2) Use Case of Unicast Frame (e.g., Control Field of Data/Control Frame)

This method may change the 240 MHz combination for each STA. In this method, the STA or AP may request first, and may respond to the request.

Figure 28:
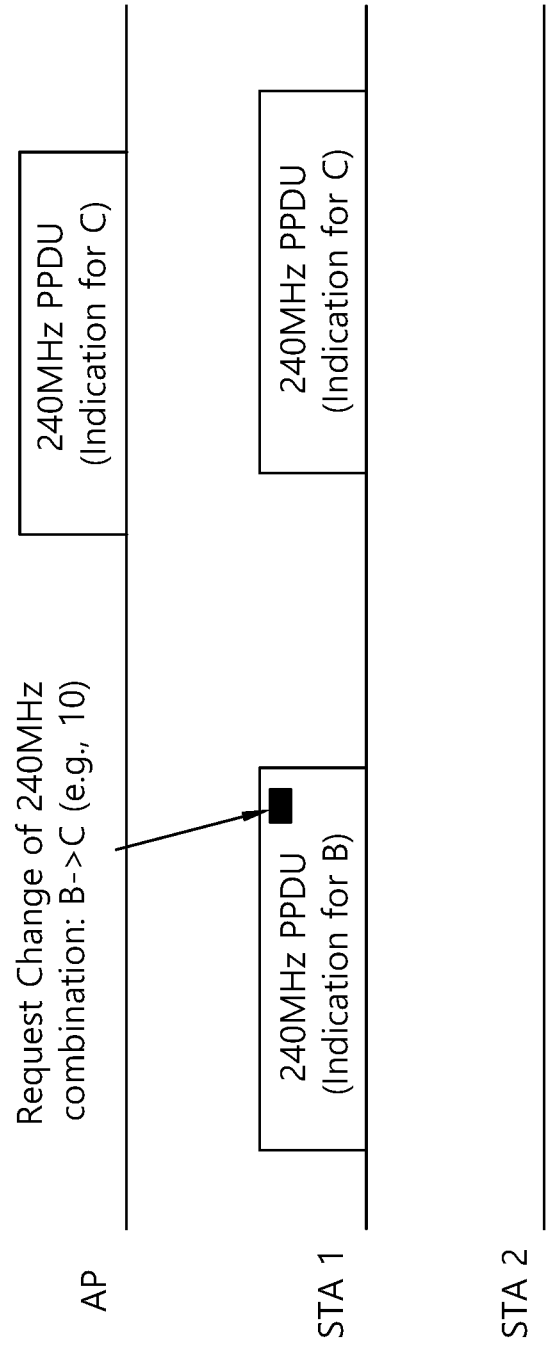
FIG. 28 is a diagram illustrating an embodiment of a method for changing a 240 MHz combination.

FIG. 28 is a diagram illustrating an embodiment of a method for changing a 240 MHz combination.

Referring to FIG. 28, when STA 1 is transmitting a signal on 240 MHz based on combination B, the STA 1 may intend to change to combination C, then the corresponding information may be included in a frame and transmitted to the AP.

In this case, the AP may use combination C based on this information or transmit a response signal when transmitting a frame to the STA 1. For example, if the AP responds to the STA 1 by indicating the combination B as it is, the combination is not changed, and if the AP indicates the combination C, 240 MHz transmission with the STA 1 may be performed based on the changed combination C.

Figure 29:
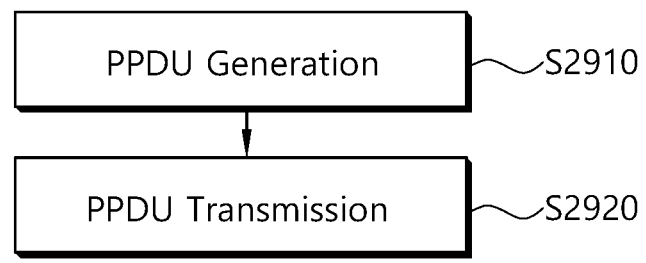
FIG. 29 is a diagram illustrating an embodiment of a transmission station (STA) operation.

FIG. 29 is a diagram illustrating an embodiment of a transmission station (STA) operation.

Referring to FIG. 29, the transmitting STA may generate a PPDU (S2910). For example, the transmitting STA may generate a physical protocol data unit (PPDU) including channel center frequency segment (CCFS) information and first puncturing pattern information.

For example, the CCFS information includes CCFS0, which is channel center frequency (CCF) information of a primary 80 MHz channel, CCFS1 which is CCF information of a primary 160 MHz channel, and CCFS2 which is CCF information of a 320 MHz channel, and the CCFS0 and CCFS1 have a value greater than zero (0), a difference between the CCFS1 and the CCFS0 has a value of eight (8), the difference between the CCFS2 and the CCFS1 has a value of sixteen (16), and the first puncturing pattern information includes information related to whether puncturing is performed for an 80 MHz band unit included in the 320 MHz channel.

For example, the CCFS0 is channel center frequency index information of the primary 80 MHz channel, the CCFS1 is channel center frequency index information of the primary 160 MHz channel, and the CCFS2 is channel center frequency index information of the 320 MHz channel.

For example, the 320 MHz channel includes the primary 80 MHz channel, a first secondary 80 MHz channel, a second secondary 80 MHz channel, and a third secondary 80 MHz channel, and the first puncturing pattern information includes information related to puncturing of one of the first to third secondary 80 MHz channels.

For example, the first puncturing pattern information is 2-bit information and includes information that an 80 MHz band is punctured within the 320 MHz channel and a 240 MHz band is used within the 320 MHz channel.

For example, the first puncturing pattern information is Media Access Control (MAC) layer information.

For example, the PPDU further includes second puncturing pattern information, wherein the second puncturing pattern information includes information related to whether puncturing is performed for a 20 MHz band unit included in the 320 MHz channel.

For example, the channel center frequency index may be an index assigned to each channel, and channels having an index value different by '1' may have a center frequency different by 5 MHz. For example, having a difference of '16' between the CCFS2 and the CCFS1 in the 320 MHz channel may mean that the center frequency of the CCFS2 (i.e., the center frequency of the 320 MHz channel) and the center frequency of the primary 160 MHz channel are separated by 80 MHz.

For example, in 320 MHz, CCFS0 may indicate a channel center frequency index of a primary 80 MHz channel, CCFS1 may indicate a channel center frequency index of a primary 160 MHz channel, and CCFS2 may indicate a channel center frequency of a 320 MHz channel. For example, the CCFS1 and CCFS2 may be greater than '0', and the difference between CCFS1 and CCFS0 may be '8'. The difference between the CCFS1 and the CCFS0 of '8' may mean that the channel center frequency of the primary 80 MHz channel and the channel center frequency of the primary 160 MHz channel are 40 MHz apart. For example, the difference between CCFS2 and CCFS1 may be '16'. The difference between CCFS2 and CCFS1 of '16' may mean that the channel center frequency of the primary 160 MHz channel and the channel center frequency of the 320 MHz channel are separated by 80 MHz.

For example, in '160 MHz+160 MHz', the CCFS0 may indicate a channel center frequency index of a primary 80 MHz channel, the CCFS1 may indicate a channel center frequency index of a primary 160 MHz channel, and the CCFS2 may indicate a channel center frequency index of a secondary 160 MHz channel. For example, the CCFS1 and CCFS2 may be greater than '0', and the difference between the CCFS1 and CCFS0 may be '8'. The difference between CCFS0 and CCFS1 of 8 may mean that the channel center frequency of the primary 80 MHz channel and the channel center frequency of the primary 160 MHz channel are 40 MHz apart. For example, the difference between the CCFS2 and CCFS1 may be greater than '32'. A difference between the CCFS2 and CCFS1 greater than 32 may mean that the channel center frequency of the secondary 160 MHz channel and the channel center frequency of the primary 160 MHz channel are more than 160 MHz apart.

Since P20 must always be included, P80 must be included in the 80 MHz units. Therefore, the following combination may exist for 240 MHz (i.e., indicating a punctured 80 Hz position).

A. 240 MHz excluding 'S80'-1 within 320 MHz
B. 240 MHz excluding 'S80'-2 within 320 MHz
C. 240 MHz excluding 'S80'-3 within 320 MHz The puncturing information may be expressed and transmitted as follows, but is not limited thereto.

Bitmap: It is used as a selection of supported combinations or one or more combinations Ex) 3bit=>100:240 MHz uses Method A (i.e., indicates a location of punctured 80 Hz). That is, 'S80'-1 is punctured.

Bit combination: It is used as a combination selection (i.e. using index).

Ex) 2bit=>'00' for 'Method A', '01' for 'Method B', '10' for 'Method C' (i.e., define what the index means). That is, '00' for 'S80'-1 puncturing, '01' for 'S80'-2 puncturing, and '11' for 'S80'-3 puncturing.

In addition to the 240 MHz indication, puncturing within 320 MHz may be considered. In the case of the maximum bandwidth (BW) of 320 MHz, 16 bits can be used for puncturing information assuming CCA is performed in units of 20 MHz. However, the number of bits for puncturing information may vary according to the maximum bandwidth and CCA units. Hereinafter, the following features are based on a bandwidth of 320 MHz and 20 MHz CCA units.

1) Explicit Indication for 240 MHz+Puncturing Bitmap for 320 MHz

Basically, the 240 MHz indication may indicate a punctured 80 MHz part as a bitmap or use an indexing method.

Ex 1) For 320 MHz puncturing information, a 16-bit bitmap capable of indicating each punctured 20 MHz may be used. For example, since Primary 20 should not be punctured, only 15-bitmaps except for Primary 20 may be used in the 16-bit bitmap. For example, a 14-bit bitmap may be used. For example, assuming that both the primary 20 and the secondary 20 are not punctured at the same time, a 14-bit bitmap may be used for further reducing 1 bit.

240 MHz (100)+320 MHz Puncturing (0000 1111 1100 0000)

The above is an example of 240 MHz puncturing information (bitmap) and 320 MHz puncturing 16-bit indication. The preceding "0000" (Primary 80) may be indicated as "000" or "00" to reduce overhead. "100" may include information related to 240 MHz except for 'S80'-1. The 320 MHz puncturing 16 bits may include information that the 'S80'-1 part is all punctured ("1111") and information that the upper 484RU is punctured through "1100" in 'S80'-2.

240 MHz (100)+320 MHz Puncturing (0000 0000 1100 0000)

The above is an example of 240 MHz puncturing information (bitmap) and 320 MHz puncturing 16-bit indication. The preceding "0000" (Primary 80) may be indicated as "000" or "00" to reduce overhead. In this example, the 240 MHz transmission method is first indicated in the 320 MHz PPDU bandwidth, and then puncturing information due to the incumbent device is indicated in the next 320 MHz. "100" may include information related to 240 MHz except for 'S80'-1. The 320 MHz puncturing 16 bits may include information ("1100") indicating that the upper 484RU is punctured in 'S80'-2.

Ex 2) A bitmap for 240 MHz excluding 80 MHz punctured within 320 MHz may be configured dynamically. For example, if 'S80'-1 is punctured, puncturing information can be configured with 12 bits except for 4 bits as much as 'S80'-1. As in Ex 1) above, since Primary 20 should not be punctured, only 11-bitmap except Primary 20 may be used in 12-bit bitmap. For example, it is assumed that both primary 20 and secondary 20 are not punctured at the same time, and only a 10-bit bitmap may be used for further reducing 1 bit. The overhead can be reduced compared to Method Ex 1).

240 MHz (100)+320 MHz Puncturing (0000 1100 0000)

The above is an example of 240 MHz puncturing information (bitmap) and 320 MHz puncturing 12-bit indication. As mentioned above, the preceding "0000" (Primary 80) may be indicated as "000" or "00" to reduce overhead. "100" may include information related to 240 MHz except for 'S80'-1. In 320 MHz puncturing, the bit of 'S80'-1 part may be excluded. Accordingly, in '0000 1100 0000', the first 4 bits ('0000') may be puncturing information of P80, the second 4 bits ('1100') may be puncturing information of 'S80'-2, and the third 4 bits ('0000') may be puncturing information of 'S80'-3. Accordingly, '1100' may include information indicating that the upper 484RU is punctured in 'S80'-2.

Method-2) Explicit indication for 240 MHz+Additional index for Puncturing pattern for 320 MHz (bit combination)

In the 240 MHz indication, as described above, a punctured 80 MHz part is indicated by a bitmap based on 3 bits (that is, a part to be punctured among three S80s except for P80) or a bit combination method may be used.

The 320 MHz puncturing information may include bits capable of indicating as many as the determined number of puncturing patterns if a puncturing pattern is determined. If the puncturing pattern is determined as shown in FIG. 24, since the number of puncturing patterns is '43', 6 bits may be needed to index the puncturing patterns. That is, the number of bits constituting the puncturing information may vary depending on how a possible puncturing pattern is defined. In addition, if the number of puncturing patterns can be changed according to the previous indication of 240 MHz, the number of bits can be changed accordingly.

The bit combination method may reduce overhead compared to the bitmap method, but may be dependent on the puncturing pattern in the PHY layer (i.e., flexibility in MAC may be reduced).

240 MHz (100)+320 MHz Puncturing (001110)

The above is an example of a 240 MHz bitmap indication and a 320 MHz puncturing pattern index 6-bit (using index) indication. In this example, "100" may include information related to 240 MHz except for 'S80'-1 within 320 MHz. For example, the value '14' may mean [xxxx xxxx oooo oooo] (i.e., the 14th puncturing pattern) in FIG. 24, and the puncturing pattern index may be "001110" (i.e., the decimal number '14').

For example, value 1 may mean [oooo oooo oooo oooo] (i.e., the first puncturing pattern) in FIG. 24, and the puncturing pattern index may be "000001" (i.e., decimal number 1).

The transmitting STA may transmit the PPDU through a 320 MHz channel (S2920). Here, the 320 MHz channel may be a punctured 320 MHz channel, and thus may be a channel having a substantially smaller band than 320 MHz.

Figure 30:
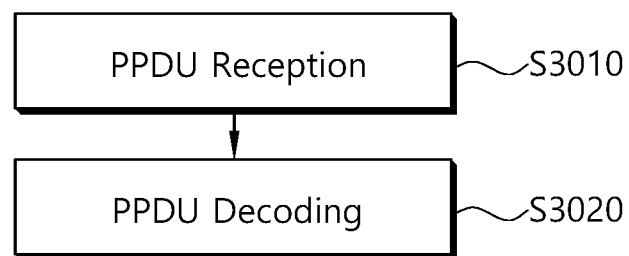
FIG. 30 is a diagram illustrating an embodiment of an operation of a receiving station (STA).

FIG. 30 is a diagram illustrating an embodiment of an operation of a receiving station (STA).

Referring to FIG. 30, a receiving STA may receive a PPDU (S3010). For example, the receiving STA may receive the PPDU through a 320 MHz channel.

The receiving STA may decode the PPDU (S3020). For example, the receiving STA may obtain puncturing information of the PPDU based on the puncturing information included in a MAC layer signal of the received PPDU.

For example, the receiving STA may decode the physical protocol data unit (PPDU) including channel center frequency segment (CCFS) information and first puncturing pattern information.

For example, the CCFS information includes CCFS0, which is channel center frequency (CCF) information of a primary 80 MHz channel, CCFS1 which is CCF information of a primary 160 MHz channel, and CCFS2 which is CCF information of a 320 MHz channel, and the CCFS0 and CCFS1 have a value greater than zero (0), a difference between the CCFS1 and the CCFS0 has a value of eight (8), the difference between the CCFS2 and the CCFS1 has a value of sixteen (16), and the first puncturing pattern information includes information related to whether puncturing is performed for an 80 MHz band unit included in the 320 MHz channel.

For example, the CCFS0 is channel center frequency index information of the primary 80 MHz channel, the CCFS1 is channel center frequency index information of the primary 160 MHz channel, and the CCFS2 is channel center frequency index information of the 320 MHz channel.

For example, the 320 MHz channel includes the primary 80 MHz channel, a first secondary 80 MHz channel, a second secondary 80 MHz channel, and a third secondary 80 MHz channel, and the first puncturing pattern information includes information related to puncturing of one of the first to third secondary 80 MHz channels.

For example, the first puncturing pattern information is 2-bit information and includes information that an 80 MHz band is punctured within the 320 MHz channel and a 240 MHz band is used within the 320 MHz channel.

For example, the first puncturing pattern information is Media Access Control (MAC) layer information.

For example, the PPDU further includes second puncturing pattern information, wherein the second puncturing pattern information includes information related to whether puncturing is performed for a 20 MHz band unit included in the 320 MHz channel.

For example, the channel center frequency index may be an index assigned to each channel, and channels having an index value different by '1' may have a center frequency different by 5 MHz. For example, having a difference of '16' between the CCFS2 and the CCFS1 in the 320 MHz channel may mean that the center frequency of the CCFS2 (i.e., the center frequency of the 320 MHz channel) and the center frequency of the primary 160 MHz channel are separated by 80 MHz.

For example, in 320 MHz, CCFS0 may indicate a channel center frequency index of a primary 80 MHz channel, CCFS1 may indicate a channel center frequency index of a primary 160 MHz channel, and CCFS2 may indicate a channel center frequency of a 320 MHz channel. For example, the CCFS1 and CCFS2 may be greater than '0', and the difference between CCFS1 and CCFS0 may be '8'.

The difference between the CCFS1 and the CCFS0 of '8' may mean that the channel center frequency of the primary 80 MHz channel and the channel center frequency of the primary 160 MHz channel are 40 MHz apart. For example, the difference between CCFS2 and CCFS1 may be '16'. The difference between CCFS2 and CCFS1 of '16' may mean that the channel center frequency of the primary 160 MHz channel and the channel center frequency of the 320 MHz channel are separated by 80 MHz.

For example, in '160 MHz+160 MHz', the CCFS0 may indicate a channel center frequency index of a primary 80 MHz channel, the CCFS1 may indicate a channel center frequency index of a primary 160 MHz channel, and the CCFS2 may indicate a channel center frequency index of a secondary 160 MHz channel. For example, the CCFS1 and CCFS2 may be greater than '0', and the difference between the CCFS1 and CCFS0 may be '8'. The difference between CCFS0 and CCFS1 of 8 may mean that the channel center frequency of the primary 80 MHz channel and the channel center frequency of the primary 160 MHz channel are 40 MHz apart. For example, the difference between the CCFS2 and CCFS1 may be greater than '32'. A difference between the CCFS2 and CCFS1 greater than 32 may mean that the channel center frequency of the secondary 160 MHz channel and the channel center frequency of the primary 160 MHz channel are more than 160 MHz apart.

Since P20 must always be included, P80 must be included in the 80 MHz units. Therefore, the following combination may exist for 240 MHz (i.e., indicating a punctured 80 Hz position).

A. 240 MHz excluding 'S80'-1 within 320 MHz
B. 240 MHz excluding 'S80'-2 within 320 MHz
C. 240 MHz excluding 'S80'-3 within 320 MHz The puncturing information may be expressed and transmitted as follows, but is not limited thereto.

Bitmap: It is used as a selection of supported combinations or one or more combinations Ex) 3bit=>100 : 240 MHz uses Method A (i.e., indicates a location of punctured 80 Hz). That is, 'S80'-1 is punctured.

Bit combination: It is used as a combination selection (i.e. using index).

Ex) 2bit=>'00' for 'Method A', '01' for 'Method B', '10' for 'Method C' (i.e., define what the index means). That is, '00' for 'S80'-1 puncturing, '01' for 'S80'-2 puncturing, and '11' for 'S80'-3 puncturing.

In addition to the 240 MHz indication, puncturing within 320 MHz may be considered. In the case of the maximum bandwidth (BW) of 320 MHz, 16 bits can be used for puncturing information assuming CCA is performed in units of 20 MHz. However, the number of bits for puncturing information may vary according to the maximum bandwidth and CCA units. Hereinafter, the following features are based on a bandwidth of 320 MHz and 20 MHz CCA units.

1) Explicit Indication for 240 MHz+Puncturing Bitmap for 320 MHz

Basically, the 240 MHz indication may indicate a punctured 80 MHz part as a bitmap or use an indexing method.

Ex 1) For 320 MHz puncturing information, a 16-bit bitmap capable of indicating each punctured 20 MHz may be used. For example, since Primary 20 should not be punctured, only 15-bitmaps except for Primary 20 may be used in the 16-bit bitmap. For example, a 14-bit bitmap may be used. For example, assuming that both the primary 20 and the secondary 20 are not punctured at the same time, a 14-bit bitmap may be used for further reducing 1 bit.

240 MHz (100)+320 MHz Puncturing (0000 1111 1100 0000)

The above is an example of 240 MHz puncturing information (bitmap) and 320 MHz puncturing 16-bit indication. The preceding "0000" (Primary 80) may be indicated as "000" or "00" to reduce overhead. "100" may include information related to 240 MHz except for 'S80'-1. The 320 MHz puncturing 16 bits may include information that the 'S80'-1 part is all punctured ("1111") and information that the upper 484RU is punctured through "1100" in 'S80'-2.

240 MHz (100)+320 MHz Puncturing (0000 0000 1100 0000)

The above is an example of 240 MHz puncturing information (bitmap) and 320 MHz puncturing 16-bit indication. The preceding "0000" (Primary 80) may be indicated as "000" or "00" to reduce overhead. In this example, the 240 MHz transmission method is first indicated in the 320 MHz PPDU bandwidth, and then puncturing information due to the incumbent device is indicated in the next 320 MHz. "100" may include information related to 240 MHz except for 'S80'-1. The 320 MHz puncturing 16 bits may include information ("1100") indicating that the upper 484RU is punctured in 'S80'-2.

Ex 2) A bitmap for 240 MHz excluding 80 MHz punctured within 320 MHz may be configured dynamically. For example, if 'S80'-1 is punctured, puncturing information can be configured with 12 bits except for 4 bits as much as 'S80'-1. As in Ex 1) above, since Primary 20 should not be punctured, only 11-bitmap except Primary 20 may be used in 12-bit bitmap. For example, it is assumed that both primary 20 and secondary 20 are not punctured at the same time, and only a 10-bit bitmap may be used for further reducing 1 bit. The overhead can be reduced compared to Method Ex 1).

240 MHz (100)+320 MHz Puncturing (0000 1100 0000)

The above is an example of 240 MHz puncturing information (bitmap) and 320 MHz puncturing 12-bit indication. As mentioned above, the preceding "0000" (Primary 80) may be indicated as "000" or "00" to reduce overhead. "100" may include information related to 240 MHz except for 'S80'-1. In 320 MHz puncturing, the bit of 'S80'-1 part may be excluded. Accordingly, in '0000 1100 0000', the first 4 bits ('0000') may be puncturing information of P80, the second 4 bits ('1100') may be puncturing information of 'S80'-2, and the third 4 bits ('0000') may be puncturing information of 'S80'-3. Accordingly, '1100' may include information indicating that the upper 484RU is punctured in 'S80'-2.

Method-2) Explicit indication for 240 MHz+Additional index for Puncturing pattern for 320 MHz (bit combination)

In the 240 MHz indication, as described above, a punctured 80 MHz part is indicated by a bitmap based on 3 bits (that is, a part to be punctured among three S80s except for P80) or a bit combination method may be used.

The 320 MHz puncturing information may include bits capable of indicating as many as the determined number of puncturing patterns if a puncturing pattern is determined. If the puncturing pattern is determined as shown in FIG. 24, since the number of puncturing patterns is '43', 6 bits may be needed to index the puncturing patterns. That is, the number of bits constituting the puncturing information may vary depending on how a possible puncturing pattern is defined. In addition, if the number of puncturing patterns can be changed according to the previous indication of 240 MHz, the number of bits can be changed accordingly.

The bit combination method may reduce overhead compared to the bitmap method, but may be dependent on the puncturing pattern in the PHY layer (i.e., flexibility in MAC may be reduced).

240 MHz (100)+320 MHz Puncturing (001110)

The above is an example of a 240 MHz bitmap indication and a 320 MHz puncturing pattern index 6-bit (using index) indication. In this example, "100" may include information related to 240 MHz except for 'S80'-1 within 320 MHz. For example, the value '14' may mean [xxxx xxxx 0000 0000] (i.e., the 14th puncturing pattern) in FIG. 24, and the puncturing pattern index may be "001110" (i.e., the decimal number '14').

For example, value 1 may mean [0000 0000 0000 0000] (i.e., the first puncturing pattern) in FIG. 24, and the puncturing pattern index may be "000001" (i.e., decimal number 1).

Some of the detailed steps shown in the examples of FIGS. 29 and 30 may not be essential steps and may be omitted. In addition to the steps shown in FIGS. 29 and 30, other steps may be added, and the order of the steps may vary. Some\of the above steps may have their independent\technical meaning.

The technical features of the present specification described above may be applied to various devices and methods. For example, the above-described technical features of the present specification may be performed/supported through the apparatus of FIGS. 1 and/or 19. For example, the above-described technical features of the present specification may be applied only to a part of FIGS. 1 and/or 19. For example, the technical features of the present specification described above are implemented based on the processing chip(s) 114 and/or 124 of FIG. 1, or implemented based on the processor(s) 111 and/or 121 and the memory(s) 112 and/or 122 of FIG. 1, or may be implemented based on the processor 610 and the memory 620 of FIG. 19. For example, the apparatus of the present specification includes a memory and a processor operatively coupled to the memory, wherein the processor is configured to: generate a physical protocol data unit (PPDU) including channel center frequency segment (CCFS) information and first puncturing pattern information; and transmit the PPDU through a 320 MHz channel, wherein the CCFS information includes CCFS0 which is channel center frequency (CCF) information of a primary 80 MHz channel, CCFS1 which is CCF information of a primary 160 MHz channel, and CCFS2 which is CCF information of a 320 MHz channel, wherein the CCFS0 and the CCFS1 have a value greater than zero (0), wherein a difference between the CCFS1 and the CCFS0 has a value of eight (8), wherein a difference between the CCFS2 and the CCFS1 has a value of sixteen (16), wherein the first puncturing pattern information includes information related to whether puncturing is performed for an 80 MHz band unit included in the 320 MHz channel.

The technical features of the present specification may be implemented based on a CRM (computer readable medium). For example, the CRM proposed by the present specification includes an instruction based on being executed by at least one processor of a transmitting STA (station) of a wireless local area network system. In at least one computer-readable recording medium stores instructions that perform operations comprising: generating a physical protocol data unit (PPDU) including channel center frequency segment (CCFS) information and first puncturing pattern information; and transmitting the PPDU through a 320 MHz channel, wherein the CCFS information includes CCFS0 which is channel center frequency (CCF) information of a primary 80 MHz channel, CCFS1 which is CCF information of a primary 160 MHz channel, and CCFS2 which is CCF information of a 320 MHz channel, wherein the CCFS0 and the CCFS1 have a value greater than zero (0), wherein a difference between the CCFS1 and the CCFS0 has a value of eight (8), wherein a difference between the CCFS2 and the CCFS1 has a value of sixteen (16), wherein the first puncturing pattern information includes information related to whether puncturing is performed for an 80 MHz band unit included in the 320 MHz channel.

The instructions stored in the CRM of the present specification may be executed by at least one processor. At least one processor related to CRM in the present specification may be the processor(s) 111 and/or 121 or the processing chip(s) 114 and/or 124 of FIG. 1, or the processor 610 of FIG. 19. Meanwhile, the CRM of the present specification may be the memory(s) 112 and/or 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (LAN) system, the method comprising:
receiving, by a station (STA), a Management frame including channel center frequency segment (CCFS) information and puncturing information for a 320 MHz Basic Service Set (BSS) bandwidth,
wherein the CCFS information includes a first CCFS field indicating a channel center frequency (CCF) index of a primary 160 MHz channel, and a second CCFS field indicating a CCF index of a 320 MHz BSS bandwidth, wherein the puncturing information includes bitmap information related to at least one subchannel to be punctured within the 320 MHz BSS bandwidth, generating, by the STA, an extremely high throughput (EHT) physical protocol data unit (PPDU) based on the Management frame, wherein the EHT PPDU includes a legacy signal (L-SIG) field, a repeated L-SIG field (RL-SIG) which is a repeat of the L-SIG field, and a control signal field, wherein the L-SIG field includes a length field which is set to a value satisfying a condition that a remainder is zero when the length field is divided by three, wherein the RL-SIG field is contiguous to the L-SIG field, wherein the control signal field carries control information to interpret the EHT PPDU and is contiguous to the RL-SIG field, and wherein the control signal field includes first information related to an identifier of a BSS, second information related to a transmission opportunity (TXOP), third information related to a bandwidth of the EHT PPDU, and fourth information indicating whether the EHT PPDU is transmitted in uplink (UL) or downlink (DL); and transmitting, by the STA, the EHT PPDU.

2. The method of claim 1, wherein the Management frame is included in a Medium Access Control (MAC) frame.

3. The method of claim 1, wherein the bandwidth of the EHT PPDU is determined based on the Management frame, and the Management frame is a Beacon frame.

4. The method of claim 1, wherein the first CCFS field has a length of one octet, and the second CCFS field has a length of one octet.

5. The method of claim 1, wherein the Management frame is received from a multi-link device (MLD), wherein the MLD supports a multi-link communication related to a plurality of links, wherein the Management frame further includes a link identifier (ID) related to at least one of the plurality of links supported by the MLD.

6. The method of claim 5, wherein the Management frame further includes capability information related to whether the MLD supports a communication over 6 GHz band.

7. A station (STA) used in a wireless local area network (LAN) system, comprising:
  a memory; and
  a processor operatively coupled to the memory,
  wherein the processor is adapted to:
  receive a Management frame including channel center frequency segment (CCFS) information and puncturing information for a 320 MHz Basic Service Set (BSS) bandwidth, wherein the CCFS information includes a first CCFS field indicating a channel center frequency (CCF) index of a primary 160 MHz channel, and a second CCFS field indicating a CCF index of a 320 MHz BSS bandwidth,
  wherein the puncturing information includes bitmap information related to at least one subchannel to be punctured within the 320 MHz BSS bandwidth,
  generate an extremely high throughput (EHT) physical protocol data unit (PPDU) based on the Management frame,
  wherein the EHT PPDU includes a legacy signal (L-SIG) field, a repeated L-SIG field (RL-SIG) which is a repeat of the L-SIG field, and a control signal field,
  wherein the L-SIG field includes a length field which is set to a value satisfying a condition that a remainder is zero when the length field is divided by three,
  wherein the RL-SIG field is contiguous to the L-SIG field,
  wherein the control signal field carries control information to interpret the EHT PPDU and is contiguous to the RL-SIG field, and
  wherein the control signal field includes first information related to an identifier of a BSS, second information related to a transmission opportunity (TXOP), third information related to a bandwidth of the EHT PPDU, and fourth information indicating whether the EHT PPDU is transmitted in uplink (UL) or downlink (DL); and
  transmit the EHT PPDU.

8. The STA of claim 7, wherein the Management frame is included in a Medium Access Control (MAC) frame.

9. The STA of claim 7, wherein the bandwidth of the EHT PPDU is determined based on the Management frame, and the Management frame is a Beacon frame.

10. The STA of claim 7, wherein the first CCFS field has a length of one octet, and the second CCFS field has a length of one octet.

11. The STA of claim 7, wherein the Management frame is received from a multi-link device (MLD), wherein the MLD supports a multi-link communication related to a plurality of links, wherein the Management frame further includes a link identifier (ID) related to at least one of the plurality of links supported by the MLD.

12. The STA of claim 11, wherein the Management frame further includes capability information related to whether the MLD supports a communication over 6 GHz band.

13. A device used in a wireless local area network (LAN) system, comprising:
  a memory; and
  a processor operatively coupled to the memory,
  wherein the processor is adapted to:
    transmit a Management frame including channel center frequency segment (CCFS) information and puncturing information for a 320 MHz Basic Service Set (BSS) bandwidth,
    wherein the CCFS information includes a first CCFS field indicating a channel center frequency (CCF) index of a primary 160 MHz channel, and a second CCFS field indicating a CCF index of a 320 MHz BSS bandwidth,
    wherein the puncturing information includes bitmap information related to at least one subchannel to be punctured within the 320 MHz BSS bandwidth.and
    receive an extremely high throughput (EHT) physical protocol data unit (PPDU), which is generated based on the Management frame,
    wherein the EHT PPDU includes a legacy signal (L-SIG) field, a repeated L- SIG field (RL-SIG) which is a repeat of the L-SIG field, and a control signal field,
    wherein the L-SIG field includes a length field which is set to a value satisfying a condition that a remainder is zero when the length field is divided by three
    wherein the RL-SIG field is contiguous to the L-SIG field,
    wherein the control signal field carries control information to interpret the EHT PPDU and is contiguous to the RL-SIG field, and
    wherein the control signal field includes first information related to an identifier of a BSS, second information related to a transmission opportunity (TXOP), third information related to a bandwidth of the EHT PPDU, and fourth information indicating whether the EHT PPDU is transmitted in uplink (UL) or downlink (DL).

14. The device of claim 13, wherein the Management frame is included in a Medium Access Control (MAC) frame.

15. The device of claim 13, wherein the bandwidth of the EHT PPDU is determined based on the Management frame, and the Management frame is a Beacon frame.

16. The device of claim 13, wherein the first CCFS field has a length of one octet, and the second CCFS field has a length of one octet.

17. The device of claim 13, wherein the device supports a multi-link communication related to a plurality of links, wherein the Management frame further includes a link identifier (ID) related to at least one of the plurality of links supported by the device.

18. The device of claim 17, wherein the Management frame further includes capability information related to whether the device supports a communication over 6 GHz band.

* * * * *